(12) United States Patent
Khaled et al.

(10) Patent No.: US 9,663,723 B2
(45) Date of Patent: May 30, 2017

(54) METHOD FOR REMOVING SULFUR COMPOUNDS FROM FUEL USING AN ADSORBENT

(71) Applicant: KING FAHD UNIVERSITY OF PETROLEUM AND MINERALS, Dhahran (SA)

(72) Inventors: Mazen Mohammad Khaled, Dhahran (SA); Mazen Khaled Nazal, Dhahran (SA); Muataz Ali Atieh, Dhahran (SA)

(73) Assignee: King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 14/836,560

(22) Filed: Aug. 26, 2015

(65) Prior Publication Data

US 2017/0058204 A1    Mar. 2, 2017

(51) Int. Cl.
| | | |
|---|---|---|
| *C10G 25/00* | (2006.01) | |
| *C10G 25/12* | (2006.01) | |
| *C10G 67/06* | (2006.01) | |
| *C10G 53/14* | (2006.01) | |
| *C10G 53/02* | (2006.01) | |
| *C10G 53/08* | (2006.01) | |

(52) U.S. Cl.
CPC ........... *C10G 25/003* (2013.01); *C10G 25/12* (2013.01); *C10G 53/02* (2013.01); *C10G 53/08* (2013.01); *C10G 53/14* (2013.01); *C10G 67/06* (2013.01)

(58) Field of Classification Search
CPC ...... C10G 25/00; C10G 25/003; C10G 25/02; C10G 25/03; C10G 25/05; C10G 25/12
See application file for complete search history.

(56) References Cited

U.S. PATENT DOCUMENTS

| | | | | |
|---|---|---|---|---|
| 3,819,532 | A * | 6/1974 | Cracknell | B01J 20/20 208/307 |
| 2005/0059549 | A1 | 3/2005 | Vo | |
| 2005/0205469 | A1 * | 9/2005 | Klabunde | C10G 25/003 208/208 R |
| 2010/0025301 | A1 * | 2/2010 | Borgna | C10G 27/04 208/243 |
| 2010/0167915 | A1 * | 7/2010 | Mohajeri | B01J 21/185 502/159 |
| 2012/0219799 | A1 | 8/2012 | Omori | |

FOREIGN PATENT DOCUMENTS

CN        101579620 B        9/2012

OTHER PUBLICATIONS

Hamze, Synthesis and characterization of MWCNT-TiO2 nanocomposite as a novel oxidative catalyst for diesel desulfurization, Mar. 2012, Proceedings of the 4th International Conference on Nanostructures, p. 232-234.*

Omid Etemadi, "Selective adsorption in ultrasound assisted oxidative desulfurization process with nano-engineered adsorbents: Mechanism and characterization", Dissertations & Theses—Gradworks, http://gradworks.umi.com/32/62/3262684.html, 2007, 4 pages.

Jiayu Dai, et al., "Gas adsorption on graphene doped with B, N, Al, and S: A theoretical study", Applied Physics Letters, vol. 95, 2009, pp. 232105-1-232105-3.

Noureddine Abidi, et al., "Molecular and Nanoparticles vapor deposition methods to create super hydro/oleophobic surfaces", Mor. J. Chem., vol. 3, No. 1, 2015, pp. 167-184.

Jason K. Vohs, et al., "Chemical Vapor Deposition of Aluminum Oxide Thin Films", Journal of Chemical Education, vol. 87, No. 10, 2010, pp. 1102-1104.

E. Badiei, et al., "Graphene Oxide Antibacterial Sheets: Synthesis and Characterization", IJE Transactions C: Aspects, vol. 27, No. 12, Dec. 2014, pp. 1803-1808.

* cited by examiner

*Primary Examiner* — Michelle Stein
(74) *Attorney, Agent, or Firm* — Oblon, McClelland, Maier & Neustadt, L.L.P.

(57) ABSTRACT

The present disclosure provides a method for removing sulfur compounds from a fuel containing sulfur compounds. The method includes contacting the fuel with an adsorbent that comprises a carbonaceous material doped with nanoparticles of aluminum oxide to reduce the concentrations of the sulfur compounds. The carbonaceous material is at least one selected from the group consisting of activated carbon, carbon nanotubes, and graphene oxide, and the adsorbent has a weight ratio of C to Al in the range from 3:1 to 30:1, and a weight ratio of C to O in the range from 1:1 to 10:1.

20 Claims, 40 Drawing Sheets

FIG. 13

| Adsorbent | Element | Weight % |
|---|---|---|
| AC | C | 92.01 |
| | O | 7.99 |
| ACAL10 | C | 62.11 |
| | O | 23.05 |
| | Al | 12.95 |
| ACAL5 | C | 63.39 |
| | O | 29.17 |
| | Al | 6.44 |
| CNTs | C | 96.48 |
| | O | 3.52 |
| CNTAL10 | C | 68.96 |
| | O | 18.86 |
| | Al | 11.18 |
| CNTAL5 | C | 86.53 |
| | O | 10.07 |
| | Al | 3.40 |
| GO | C | 79.07 |
| | O | 15.65 |
| GOAL10 | C | 68.08 |
| | O | 23.80 |
| | Al | 9.12 |
| GOAl5 | C | 69.40 |
| | O | 26.31 |
| | Al | 4.30 |

FIG. 21

Surface area, total pore volume and surface pH of AC, CNT and GO at different loadings of $Al_2O_3$

| Adsorbent | BET SA (m²/g) | DFT SA (m²/g) | V (cc/g) | pH |
|---|---|---|---|---|
| AC | 882.237 | 1414.697 | 0.449 | 9.35 |
| ACAL10 | 798.946 | 950.083 | 0.407 | 8.94 |
| ACAL5 | 824.552 | 777.883 | 0.391 | 8.45 |
| CNT | 217.235 | 173.06 | 1.513 | 5.81 |
| CNTAL10 | 183.803 | 137.703 | 0.716 | 5.73 |
| CNTAL5 | 117.954 | 149.700 | 0.550 | 5.52 |
| GO | 10.825 | 15.125 | 0.059 | 2.23 |
| GOAL10 | 11.908 | 10.937 | 0.082 | 3.03 |
| GOAL5 | 9.525 | 8.619 | 0.048 | 2.63 |

FIG. 22

Chromatographic conditions

| Parameters | Description |
|---|---|
| Mobile Phase | 100% n-Hexane |
| Analytical column | Silica, 5 µm (200 x 4.6 mm i.d.) |
| Guard column | C18, 5 µm (10 x 4.6 mm i.d.) |
| Auto-sampler temperature | 24°C |
| Flow rate | 1.0 mL/min |
| Back pressure | 29-30 bar |
| Column temperature | 24 °C |
| Injection volume | 5 µL |
| Wave length | In first 3.5min the λ is 235 nm for thiophene and from 3.5 to 5.0min the λ is 280 for DBT and Naphthalene detection. |
| Total run time | 5.5 min. |

FIG. 33A

| Adsorbent | Thiophene | | | DBT | | |
|---|---|---|---|---|---|---|
| | $n \pm (a)$ | $K_f \pm (b)$ $(mg^{(1-1/n)} mg^{-1} L^{1/n})$ | $R^2$ | $n \pm (a)$ | $K_f \pm (b)$ $(mg^{(1-1/n)} mg^{-1} L^{1/n})$ | $R^2$ |
| AC | 0.83 ±0.04 | (1.11± 0.27) x 10$^{-2}$ | 0.9898 | 1.72 ±0.12 | 4.89 ± 0.48 | 0.9747 |
| CNT | 0.45 ±0.02 | (1.98 ± 0.82) x 10$^{-5}$ | 0.9934 | 1.69 ±0.04 | (8.94 ± 0.53) x 10$^{-1}$ | 0.9968 |
| GO | 0.75 ±0.03 | (1.30 ± 0.29) x 10$^{-3}$ | 0.9935 | 1.22 ±0.05 | (1.24 ± 0.19) x 10$^{-1}$ | 0.9912 |
| ACAL10 | 1.20 ±0.02 | (1.14 ± 0.10) x 10$^{-1}$ | 0.9987 | 1.29 ±0.08 | 4.94 ± 0.04 | 0.9821 |
| ACAL5 | 1.18 ±0.03 | (9.12 ± 0.83) x 10$^{-2}$ | 0.9971 | 1.26 ±0.04 | 6.30 ± 0.23 | 0.9953 |
| CNTAL10 | 1.32 ±0.04 | (1.25 ± 0.10) x 10$^{-1}$ | 0.9943 | 1.93 ±0.04 | 2.48 ± 0.08 | 0.9982 |
| CNTAl5 | 1.10 ±0.05 | (5.48 ± 0.99) x 10$^{-2}$ | 0.9901 | 1.55 ±0.04 | 1.56 ± 0.08 | 0.9973 |
| GOAL10 | 0.93 ±0.07 | (4.17 ±1.59) x 10$^{-3}$ | 0.9692 | 1.49 ±0.05 | (2.96 ± 0.31) x 10$^{-1}$ | 0.9935 |
| GOAL5 | 1.08 ±0.01 | (4.90 ± 0.27) x 10$^{-2}$ | 0.9991 | 1.42 ±0.14 | (4.26 ± 1.17) x 10$^{-1}$ | 0.9562 |

(a) and (b): Errors calculated based on the errors in the slope and the intercept of the Freundlich linearized equation, respectively.

FIG. 33B

| Adsorbent | Langmuir | | | | | |
|---|---|---|---|---|---|---|
| | Thiophene | | | DBT | | |
| | $Q_o \pm (c)$ (mg/g) | $b \pm (d)$ (dm$^3$/mg) | $R^2$ | $Q_o \pm (c)$ (mg/g) | $b$ (dm$^3$/mg) $\pm (d)$ | $R^2$ |
| AC | | | | 41.65 ± 2.70 | (1.07 ± 0.06) × 10$^{-1}$ | 0.9795 |
| CNT | | | | 23.54 ± 1.84 | (1.50 ± 0.10) × 10$^{-2}$ | 0.9702 |
| GO | | | | 23.11 ± 3.05 | (3.00 ± 1.00) × 10$^{-3}$ | 0.9201 |
| ACAL10 | 26.07 ± 2.91 | (2.66 ± 1.00) × 10$^{-3}$ | 0.9414 | 70.22 ± 3.44 | (4.69 ± 0.20) × 10$^{-2}$ | 0.8503 |
| ACAL5 | 29.00 ± 1.31 | (1.94 ± 0.04) × 10$^{-3}$ | 0.7401 | 84.47 ± 0.77 | (7.83 ± 0.26) × 10$^{-2}$ | 0.9603 |
| CNTAL10 | 16.49 ± 3.19 | (3.65 ± 1.00) × 10$^{-3}$ | 0.8729 | 32.72 ± 3.71 | (3.37 ± 0.20) × 10$^{-2}$ | 0.9395 |
| CNTAL5 | | | | 40.60 ± 4.38 | (2.10 ± 0.01) × 10$^{-2}$ | 0.9450 |
| GOAL10 | | | | 16.37 ± 1.55 | (7.30 ± 0.14) × 10$^{-3}$ | 0.9571 |
| GOAL5 | | | | 29.25 ± 9.04 | (6.08 ± 0.88) × 10$^{-3}$ | 0.5310 |

(c) and (d): Errors calculated based on the errors in the slope and intercept of the Langmuir linearized equation, respectively.

FIG. 36

Pseudo-second order kinetic parameters of the Al$_2$O$_3$ impregnated carbonaceous materials for thiophene and DBT adsorption

| Adsorbent | Pseudo-Second order Parameters | | | | | | |
|---|---|---|---|---|---|---|---|
| | Thiophene (250ppm) | | | | DBT (250ppm) | | |
| | q$_{e,exp}$ (mg/g) | q$_{e,pred.}$ ± (e) (mg/g) | k$_2$ (g/mg min) ± (f) | R$^2$ | q$_{e,exp}$ (mg/g) | q$_{e,pred.}$ ± (e) (mg/g) | k$_2$ (g/mg min) ± (f) | R$^2$ |
| ACAL10 | 7.42 | 7.22 ± 0.05 | 0.126 ± 0.040 | 0.9998 | 39.25 | 38.7 ± 0.20 | 0.0151 ± 0.002 | 0.9999 |
| CNTAL10 | 6.06 | 6.07 ± 0.12 | 0.059 ± 0.030 | 0.9980 | 23.37 | 23.36 ± 0.05 | 0.085 ± 0.021 | 1.0000 |
| GOAL10 | 1.63 | 1.64 ± 0.02 | 0.127 ± 0.018 | 0.9992 | 9.43 | 9.46 ± 0.18 | 0.035 ± 0.017 | 0.9981 |
| ACAL5 | 8.80 | 8.38 ± 0.03 | 0.120 ± 0.022 | 1.0000 | 39.21 | 39.11 ± 0.06 | 0.033 ± 0.004 | 1.0000 |
| CNTAL5 | 7.63 | 7.42 ± 0.02 | 0.304 ± 0.104 | 1.0000 | 25.38 | 25.74 ± 0.34 | 0.023 ± 0.009 | 0.9993 |
| GOAL5 | 6.49 | 6.54 ± 0.07 | 0.131 ± 0.055 | 0.9996 | 16.77 | 16.84 ± 0.06 | 0.154 ± 0.070 | 0.9999 |

(e) The error was calculated based on the error in the slope of the linearized equation.
(f) The error was calculated based on the error in the intercept of the linearized equation.

FIG. 40

Intra-particles diffusion parameters

| Adsorbents | Intera-particles Diffusion Parameters | | |
|---|---|---|---|
| | $K_{id}$ | C | $R^2$ |
| ACAL10 | 1.0372 | 30.296 | 0.9338 |
| CNTAL10 | 0.1414 | 22.085 | 0.8046 |
| GOAL10 | 0.1881 | 7.4123 | 0.9089 |

FIG. 43

Adsorption selectivity of ACAL5 and CNTAL5

| Adsorbate | Adsorbent | | | | | | |
|---|---|---|---|---|---|---|---|
| | ACAL5 | | | | CNTAL5 | | |
| | $Q_o$ (mg/g) | Kd | $K_{DBT/Naph}$ | $K_{DBT/Thio}$ | $Q_o$ (mg/g) | Kd | $K_{DBT/Naph}$ | $K_{DBT/Thio}$ |
| DBT | 54.348 | 1.531 | 25.03 | 250.461 | 34.014 | 0.253 | 6.536 | 143.782 |
| Thiophene | 1.501 | 0.006 | | | 0.438 | 0.002 | | |
| Naphthalene | 46.729 | 0.061 | | | 33.784 | 0.039 | | |

METHOD FOR REMOVING SULFUR COMPOUNDS FROM FUEL USING AN ADSORBENT

BACKGROUND OF THE INVENTION

Technical Field

The present disclosure relates to methods for removing sulfur compounds from a fuel containing sulfur compounds using an adsorbent. The adsorbent comprises a carbonaceous material doped with nanoparticles of aluminum oxide. The carbonaceous material is at least one selected from the group consisting of activated carbon (AC), carbon nanotubes (CNTs), and graphene oxide (GO), and the adsorbent has a weight ratio of carbon (C) to aluminum (Al) in the range from 3:1 to 30:1, and a weight ratio of carbon (C) to oxygen (O) in the range from 1:1 to 10:1.

Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, is neither expressly nor impliedly admitted as prior art against the present invention.

Fossil fuels contain sulfur compounds. In jet fuel, the sulfur compounds include thiophene, benzothiophene (BT) and its derivatives. In marine gas oil, a naval logistic fuel, the sulfur compounds are mainly dibenzothiophene (DBT) and its derivatives. In diesel fuel, the major sulfur compounds are BT, alkyl-benzothiophene (alkyl-BT), DBT, and alkyl-dibenzothiophene (alkyl-DBT). The bulk of diesel fuel includes mainly saturated and aromatic hydrocarbons. Saturated hydrocarbons include n-paraffins, isoparaffins, and cycloparaffins (naphthenes). Aromatic compounds are mainly alky-benzenes, indanes, naphthalenes, tetralins, biphenyls, acenaphthenes, fluorines, acephenanthrenes, phenanthrenes, anthracenes, and naphthenophenanthrenes. Sulfur compounds comprising DBT and its derivatives are also present in used motor oil, since the sulfur compounds from fuels deposit on gas or diesel engines and increase wear of the engines.

In industrial and automobile waste gases, the sulfur compounds convert to $SO_2$ and $SO_3$ that produce acid rain. Additionally, the sulfur compounds in fossil fuels are adsorbed into catalytic converters and occupy the sites designed for CO, NO, and $NO_2$ reduction, decreasing the reduction efficiency of and causing harm to the catalytic converters. As a result, removal of sulfur compounds from fossil fuels, particularly diesel fuel, is important for protecting the environment and eliminating the financial loss in products such as catalytic converters.

The European regulation required the sulfur content in diesel to be reduced from 2000 ppmw in 1993 to 50 ppmw in 2005 and to 10 ppmw in 2009. The U.S. Environmental Protection Agency required the sulfur content in highway diesel to be reduced from 500 ppmw to 15 ppmw in 2006. In 2012, nonroad diesel fuel used in locomotive and marine applications was required to meet the 15 ppmw standard.

Common desulfurization techniques for diesel include hydrodesulfurization (HDS), biodesulfurization (BDS), oxidative desulfurization (ODS), and adsorptive desulfurization. In HDS process, sulfur compounds in diesel are removed as hydrogen sulfide. This method utilizes hydrogen over a catalyst and applies high temperature up to 380° C. and high pressure between 500 to 700 psi. Aliphatic sulfides, thiols, thiophenes, and benzothiophenes (BTs) are easily removed because the sulfur atom in their molecular structure can access the active sites of the catalyst. Larger sulfur compounds such as dibenzothiophene (DBT) and alkyl-DBTs, particularly those with the alkyl groups at 4- and 6-positions, are much harder to remove in traditional HDS. These refractory sulfur compounds in diesel have difficulty in reaching the catalyst surface due to the steric hindrance caused by the carbon atoms bound to sulfur. Although improved deep HDS methods can overcome the problem to produce ultra low sulfur fuel, they require higher temperature, higher pressure, and more hydrogen and catalyst consumption, resulting in higher capital and operational costs. Additionally, the diesel treated by deep HDS has decreased lubricity that causes increased wear in a diesel engine.

Biodesulfurization (BDS) uses enzymes to remove the refractory sulfur compounds such as DBT and its derivatives under mild operating conditions through a pathway comprising two monooxygenases, which sequentially oxidize DBT to DBT sulfone and 2-hydroxybiphenyl-29-sulfinic acid, and a desulfinase, which converts 2-hydroxybiphenyl-29-sulfinic acid to the desulfurized end product 2-hydroxybiphenyl. In BDS, incomplete conversion of sulfur compounds occurs, resulting in the original substrate DBT and oxidized sulfur compounds (DBT sulfone and 2-hydroxybiphenyl-29-sulfinic acid) remaining in the fuel. The costs and stability of the biocatalysts in BDS are another obstacle for BDS to achieve commercial viability.

The oxidative desulfurization (ODS) method is another alternative for deep desulfurization of diesel to lower the temperature and pressure conditions and reduce the cost of operation. In this method, sulfur compounds in diesel, which are slightly more polar than their analogous hydrocarbons, are selectively oxidized to form their sulfoxides/sulfones that are highly polar in the presence of an oxidizing agent, most commonly $H_2O_2$, and a transition metal catalyst such as $H_3PM_{12}O_{40}$ [M=Mo(VI), W(VI)]. The sulfoxides/sulfones can be subsequently extracted and removed by acetonitrile. However, extended reaction time to reach high yields, reaction safety due to high concentrations of $H_2O_2$, and its excessive decomposition are major impediments for commercializing this method.

Adsorptive desulfurization using solid adsorbents at lower temperature and pressure than hydrodesulfurization has been developed recently. ConocoPhillips Company introduced S-Zorb SRT for sulfur removal of diesel that uses a sorbent for attacking sulfur compounds. The sulfur atom remains in the sorbent but the hydrocarbon portion of the molecule is released. A stream of hydrogen in the process prevents the coke buildup. Another adsorption process called (PSU-SARS) was developed at Pennsylvania State University through selective adsorption at low temperature and ambient pressure without hydrogen consumption. Studies show that low sulfur results for different liquid fuels in this process have been achieved by using a composite metal catalyst on a porous substrate. This method will not adsorb the coexisting aromatic compounds like benzene and naphthalene.

Omid Etemadi investigated and proposed a desulfurization technique combining selective oxidation with adsorption using amorphous activated acidic alumina having a micrometer particle size or epoxy functionalized single wall carbon nanotubes (O-SWNT) to remove from oxidation-treated diesel benthiophene sulfone ($BTO_2$) and dibenzothiophene sulfone ($DBTO_2$), the oxidized products of BT and DBT, respectively (Etemadi, O., Selective adsorption in ultrasound assisted oxidative desulfurization process with nano-engineered adsorbents: Mechanism and Characterization (2007), incorporated herein in its entirety).

In order to meet increasingly rigorous emission control standards being imposed on fossil fuel products, effective, easy to use, and low cost desulfurization techniques, particularly for removing the refractory sulfur compounds from diesel, need to be developed to produce very low sulfur-containing or sulfur-free fuels.

BRIEF SUMMARY OF THE INVENTION

The present disclosure relates to a method of removing sulfur compounds from a fuel. The method comprises contacting the fuel with an adsorbent that comprises a carbonaceous material doped with nanoparticles of aluminum oxide to form a treated fuel having a reduced concentration of the sulfur compounds. The carbonaceous material of the adsorbent is at least one selected from the group consisting of activated carbon, carbon nanotubes, and graphene oxide. The adsorbent has a weight ratio of C to Al in the range from 3:1 to 30:1, and a weight ratio of C to O in the range from 1:1 to 10:1.

In one or more embodiments, the carbonaceous material of the adsorbent comprises multi-walled carbon nanotubes.

In one or more embodiments, the carbonaceous material is doped with the nanoparticles of aluminum oxide by incipient wetness impregnation.

In one embodiment, the fuel is diesel. In another embodiment, the fuel is jet fuel. In another embodiment, the fuel is marine gas oil. In still another embodiment, the fuel is used motor oil.

In one embodiment, the sulfur compound to be removed from the fuel is benzothiophene (BT). In another embodiment, the sulfur compound to be removed from the fuel is alkyl-benzothiophene (alkyl-BT). In another embodiment, the sulfur compound to be removed from the fuel is dibenzothiophene (DBT). In another embodiment, the sulfur compound to be removed from the fuel is alkyl-dibenzothiophene (alkyl-DBT). In another embodiment, the sulfur compounds to be removed from the fuel are thiophene and derivatives thereof.

In some embodiments, the adsorbent comprises activated carbon doped with nanoparticles of aluminum oxide, and the adsorbent removes at least about 30% of the DBT from the diesel.

In one or more embodiments, the concentration of the adsorbent contacting the fuel ranges from about 6 g/L to 24 g/L of the fuel.

In one or more embodiments, the method of removing sulfur compounds from the fuel further comprises regenerating the adsorption ability of the adsorbent. In some embodiments, the regenerating the adsorption ability of the adsorbent comprises heating the adsorbent at about 300-550° C. to remove the adsorbed sulfur compounds.

In one or more embodiments, the adsorbent is disposed in a fixed bed or fluidized bed and the contacting involves passing the fuel through the fixed bed or fluidized bed. In some embodiments, the fixed bed comprises a cartridge. In other embodiments, the cartridge further comprises at least one adsorbent selected from the group consisting of a zeolite, activated alumina, and activated carbon.

In one or more embodiments, the adsorbent has a form selected from the group consisting of granule, pellet, sphere, powder, woven fabric, non-woven fabric, mat, felt, block, and honeycomb.

In one or more embodiments, the adsorbent comprises the carbon nanotubes having an outer diameter ranging from about 10 nm to 30 nm.

In one or more embodiments, the nanoparticles of aluminum oxide have a diameter ranging from about 30 nm to 80 nm.

In one or more embodiments, the adsorbent comprises activated carbon doped with nanoparticles of aluminum oxide. The activated carbon doped with the nanoparticles of aluminum oxide has a BET surface area of greater than about 790 $m^2/g$.

In one or more embodiments, the adsorbent comprises activated carbon doped with nanoparticles of aluminum oxide. The activated carbon doped with the nanoparticles of aluminum oxide has a total pore volume of greater than about 0.39 $cm^3/g$.

In one or more embodiments, the adsorbent comprises multi-walled carbon nanotubes doped with nanoparticles of aluminum oxide. The multi-walled carbon nanotubes doped with the nanoparticles of aluminum oxide have a BET surface area of greater than about 115 $m^2/g$.

In one or more embodiments, the adsorbent comprises multi-walled carbon nanotubes doped with nanoparticles of aluminum oxide. The multi-walled carbon nanotubes doped with the nanoparticles of aluminum oxide have a total pore volume of greater than about 0.55 $cm^3/g$.

In one or more embodiments, the method of removing sulfur compounds from the fuel further comprises removing the sulfur compounds from the fuel by at least one removal method selected from the group consisting of hydrodesulfurization, biodesulfurization, oxidative desulfurization, and adsorptive desulfurization using at least one other adsorbent.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 13 is a table showing the percentages by total weight of aluminum in the $Al_2O_3$ impregnated carbonaceous materials compared to the theoretical percentages of aluminum according to Example 2.

FIG. 21 is a table showing the surface area, total pore volume and surface pH of AC, CNT and GO at different loadings of $Al_2O_3$ according to Example 2

FIG. 22 is a table showing the chromatographic conditions according to Example 3.

FIG. 33A is a table showing the Freundlich parameters and coefficients of determination for thiophene and DBT adsorption with the raw and $Al_2O_3$ impregnated carbonaceous materials according to Example 3.

FIG. 33B is a table showing the Langmuir parameters and coefficients of determination for thiophene and DBT adsorption with the raw and $Al_2O_3$ impregnated carbonaceous materials according to Example 3.

FIG. 36 is a table showing the pseudo-second order kinetic parameters of the $Al_2O_3$ impregnated carbonaceous materials for thiophene and DBT adsorption according to Example 4.

FIG. 40 is a table showing the parameters and coefficients of determination of the intra-particle diffusion model for DBT adsorption using ACAL10, CNTAL10, and GOAL10 as adsorbents according to Example 4.

FIG. 43 is a table showing the adsorption selectivity of ACAL5 and CNTAL5 according to Example 6.

DETAILED DESCRIPTION OF THE EMBODIMENTS

Figure 1:
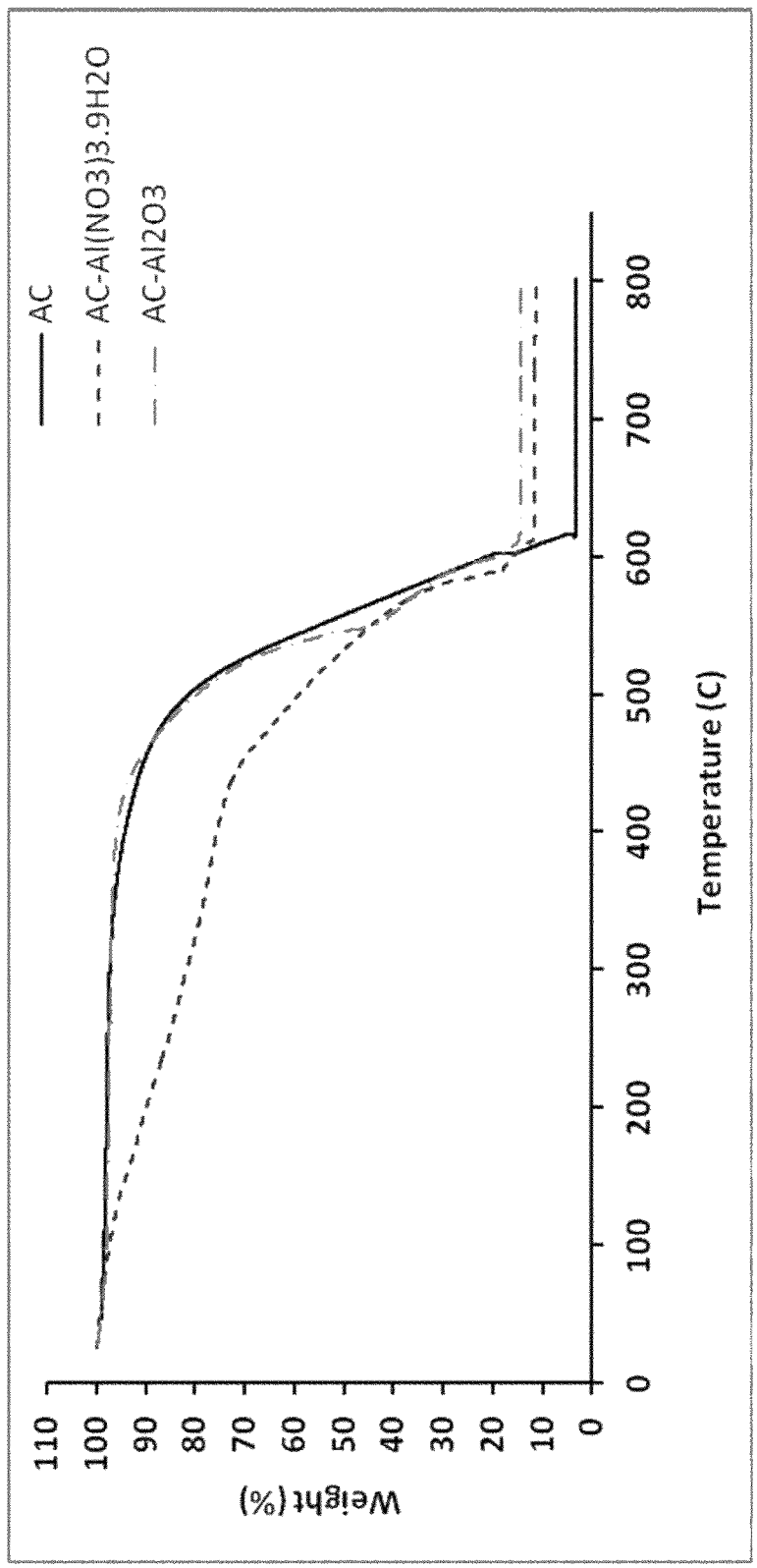
FIG. 1 is a graphical presentation of the thermal gravimetric analysis (TGA) performed with the raw AC, the AC-Al(NO$_3$)$_3$.9H$_2$O mixture without being calcinated, and the Al$_2$O$_3$ impregnated AC under air atmosphere according to Example 2.
Figure 2:
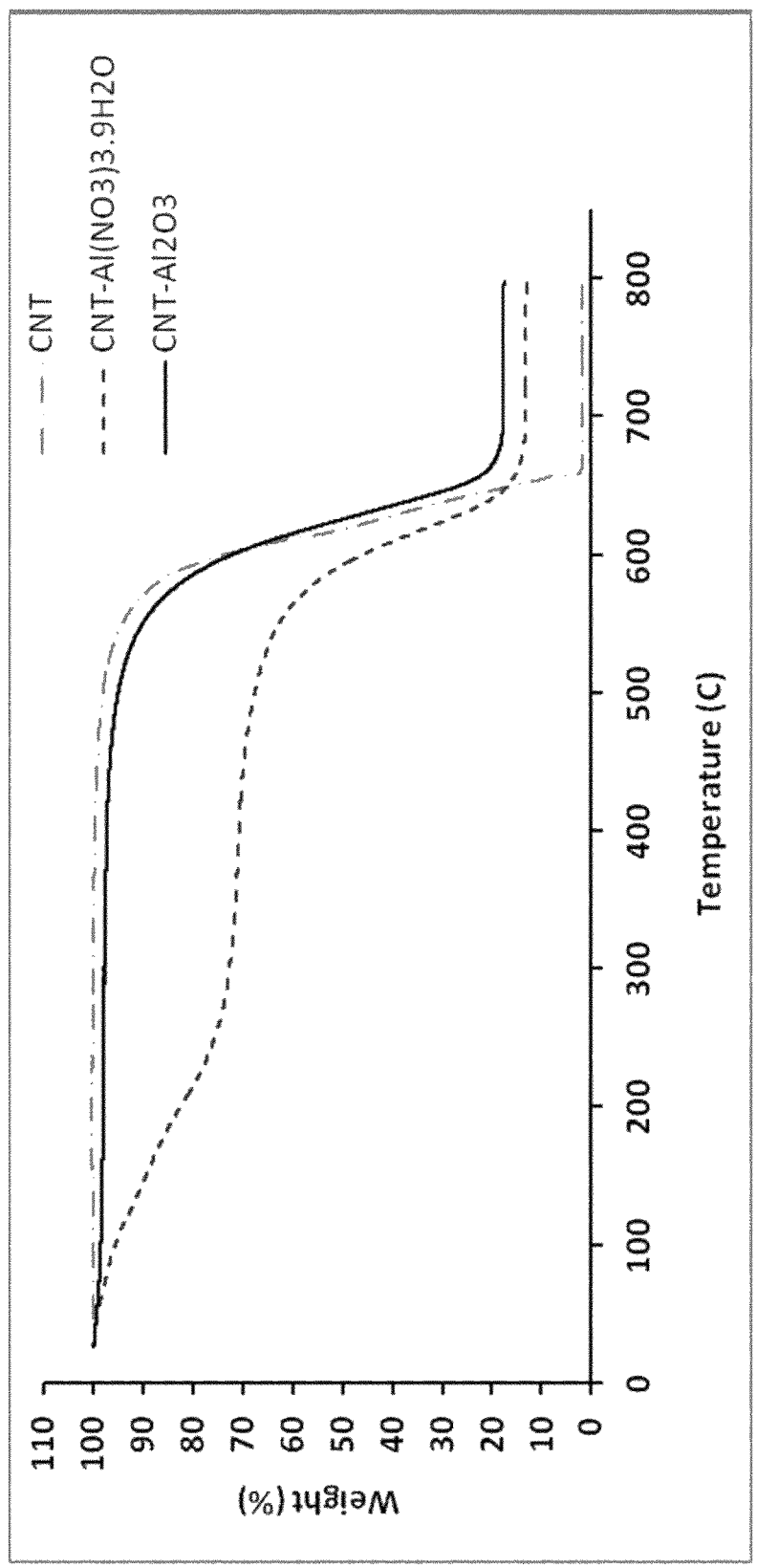
FIG. 2 is a graphical presentation of the thermal gravimetric analysis (TGA) performed with the raw CNTs, the CNT-Al(NO$_3$)$_3$.9H$_2$O mixture without being calcinated, and the Al$_2$O$_3$ impregnated CNTs under air atmosphere according to Example 2.
Figure 3:
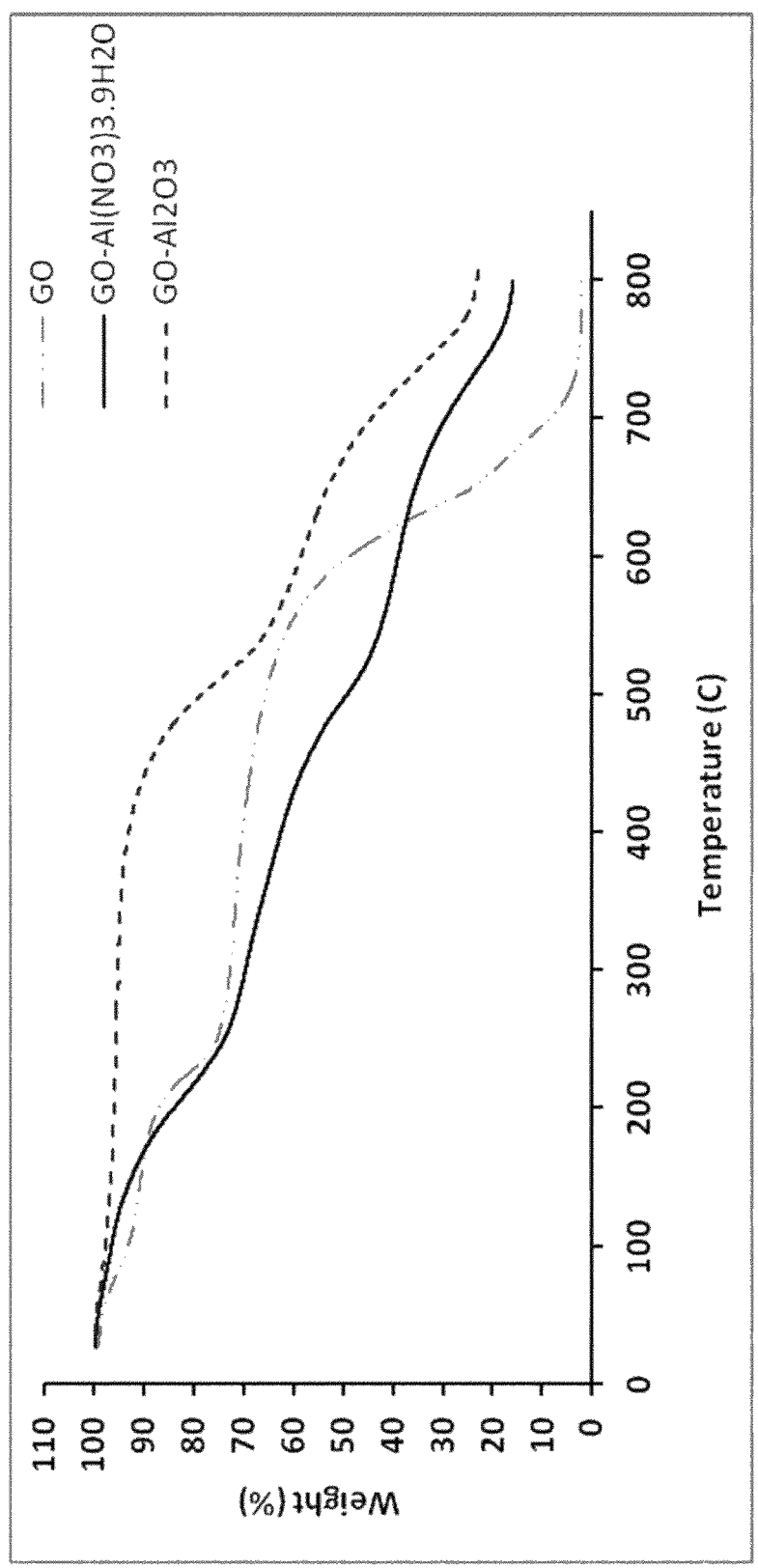
FIG. 3 is a graphical presentation of the thermal gravimetric analysis (TGA) performed with the raw GO, the GO-Al(NO$_3$)$_3$.9H$_2$O mixture without being calcinated, and the Al$_2$O$_3$ impregnated GO under air atmosphere according to Example 2.

The present disclosure provides a method of removing sulfur compounds from a fuel by contacting the fuel with an adsorbent comprising a carbonaceous material doped with nanoparticles of aluminum oxide to reduce the concentrations of sulfur compounds in the fuel.

In one embodiment, the fuel is a jet fuel. In another embodiment, the fuel is a diesel fuel. In another embodiment, the fuel is a marine gas oil. In still another embodiment, the fuel is a used motor oil.

Non-limiting examples of the sulfur compounds that can be removed by the adsorbents of the present disclosure include alkyl-DBT (e.g. 4,6-dimethyl-DBT, 4-methyl-DBT), DBT, alkyl-BT (e.g. 2-methyl-BT), BT, and thiophene and derivatives thereof.

In one embodiment, the carbonaceous material comprises activated carbon, preferably highly porous activated carbon. In some embodiments, the activated carbon has a BET surface area of at least 800 $m^2/g$ and/or a total pore volume of at least 0.4 $cm^3/g$. In other embodiments, the activated carbon has a BET surface area of at least 1000 $m^2/g$ and/or a total pore volume of at least 0.5 $cm^3/g$. In other embodiments, the activated carbon has a BET surface area of at least 1200 $m^2/g$ and/or a total pore volume of at least 0.6 $cm^3/g$. In still other embodiments, the activated carbon has a BET surface area of at least 1600 $m^2/g$ and/or a total pore volume of at least 0.7 $cm^3/g$.

In another embodiment, the carbonaceous material comprises carbon nanotubes. In some embodiments, the carbon nanotubes have an outer diameter of about 5-100 nm. In other embodiments, the carbon nanotubes have an outer diameter of about 10-90 nm. In other embodiments, the carbon nanotubes have an outer diameter of about 15-80 nm. In other embodiments, the carbon nanotubes have an outer diameter of about 20-70 nm. In other embodiments, the carbon nanotubes have an outer diameter of about 30-60 nm. In some embodiments, the BET surface area of the carbon nanotubes is at least 200 $m^2/g$. In other embodiments, the BET surface area of the carbon nanotubes is at least 400 $m^2/g$. In other embodiments, the BET surface area of the carbon nanotubes is at least 600 $m^2/g$. In some embodiments, the total pore volume of the carbon nanotubes is 0.5-3 $cm^3/g$. In other embodiments, the total pore volume of the carbon nanotubes is 0.7-2 $cm^3/g$. In other embodiments, the total pore volume of the carbon nanotubes is 0.9-1.8 $cm^3/g$.

In another embodiment, the carbonaceous material comprises multi-walled carbon nanotubes. In some embodiments, the multi-walled carbon nanotubes may have a structure conforming to the Russian Doll model, i.e. they contain sheets of graphite arranged in concentric cylinders. In other embodiments, the multi-walled carbon nanotubes have a structure conforming to the Parchment model, i.e. they contain a single sheet of graphite rolled in around themselves and resemble a scroll of parchment.

In another embodiment, the carbonaceous material comprises graphene oxide. Graphene oxide forms stacked layers of nano-structures, or nanosheets. In some embodiments, graphene oxide nanosheets have wrinkled and/or rippled morphologies, with the height of the wrinkles or ripples from the basal plane of the graphene oxide nanosheets ranging from less than 0.2 nm to about 3 nm. In other embodiments, the height may range from about 0.5 nm to about 2.5 nm. In still other embodiments, the height may range from about 1 nm to about 2 nm. In still other embodiments, the height may range from about 0.5 nm to about 1.5 nm.

In one embodiment, the nanoparticles of aluminum oxide with which the carbonaceous material is doped have substantially spherical shapes with a diameter of 10-100 nm. In another embodiment, the nanoparticles of aluminum oxide with which the carbonaceous material is doped have a diameter of 20-90 nm. In another embodiment, the nanoparticles of aluminum oxide with which the carbonaceous material is doped have a diameter of 30-80 nm. In another embodiment, the nanoparticles of aluminum oxide with which the carbonaceous material is doped have a diameter of 40-70 nm. In still another embodiment, the nanoparticles of aluminum oxide with which the carbonaceous material is doped have a diameter of 50-60 nm.

The nanoparticles of aluminum oxide can have various crystalline phases. In one embodiment, the nanoparticles of aluminum oxide comprise $\alpha$-$Al_2O_3$. In another embodiment, the nanoparticles of aluminum oxide comprise $\gamma$-$Al_2O_3$. In another embodiment, the nanoparticles of aluminum oxide comprise $\eta$-$Al_2O_3$. In another embodiment, the nanoparticles of aluminum oxide comprise $\theta$-$Al_2O_3$. In another embodiment, the nanoparticles of aluminum oxide comprise $\chi$-$Al_2O_3$. In another embodiment, the nanoparticles of aluminum oxide comprise $\kappa$-$Al_2O_3$. In still another embodiment, the nanoparticles of aluminum oxide comprise $\delta$-$Al_2O_3$.

In one embodiment, the nanoparticles of aluminum oxide form a layer covering the surface of the doped activated carbon sheets. In another embodiment, the nanoparticles of aluminum oxide form a layer covering the surface of the doped graphene oxide sheets. In another embodiment, the nanoparticles of aluminum oxide form a layer covering an exterior surface and/or an interior surface of the doped carbon nanotube. The coverage of the surfaces of the doped carbonaceous materials by the nanoparticles of aluminum oxide can vary. A preferred coverage provides the maximum surface area of aluminum oxide per unit mass of the aluminum oxide used.

In one embodiment, the adsorbent has a weight ratio of C to Al in the range from 3:1 to 30:1. In another embodiment, the adsorbent has a weight ratio of C to Al in the range from 4:1 to 10:1. In another embodiment, the adsorbent has a weight ratio of C to Al in the range from 6:1 to 26:1. In still another embodiment, the adsorbent has a weight ratio of C to Al in the range from 7:1 to 17:1.

In one embodiment, the adsorbent has a weight ratio of C to O in the range from 1:1 to 10:1. In another embodiment, the adsorbent has a weight ratio of C to O in the range from 2:1 to 3:1. In still another embodiment, the adsorbent has a weight ratio of C to O in the range from 3:1 to 9:1.

In one embodiment, the carbonaceous material is doped with the nanoparticles of aluminum oxide by incipient wetness impregnation. In incipient wetness impregnation, the carbonaceous material is mixed with a solution of an aluminum salt, non-limiting examples of which include halides, nitrates, sulfates, chlorates, carboxylates having from one to five carbon atoms such as formates, acetates, oxalates, malonates, succinates, or glutarates of aluminum. The impregnated salt is then converted to aluminum oxide by either thermal decomposition, e.g. calcination, or chemical reaction In another embodiment, the carbonaceous material is doped with the nanoparticles of aluminum oxide by chemical vapor deposition or a variation of it, nanoparticle vapor deposition. For example, using these techniques combined with controlled hydrolysis of the water-sensitive precursor liquid, dimethylaluminumisopropoxide, the nanoparticles of aluminum oxide can be deposited on a surface of the carbonaceous material.

In one embodiment, the adsorbent comprises activated carbon doped with nanoparticles of aluminum oxide, and the adsorbent removes at least about 30% of the DBT from the diesel. In some embodiments, the diesel is a highway transportation diesel. In other embodiments, the diesel is a marine gas oil rich in DBT and its derivatives.

The concentrations of the adsorbents used to remove the sulfur compounds from the fuel can vary, depending on the removal efficiency required, the availability of the adsorbents, the capacity for the treatment of the fuel with the adsorbents, e.g. the size of a vessel used for batch adsorption, the capacity for filtration of the adsorbents from the fuel, and the capacity for regenerating the adsorbents, etc. A typical concentration of the adsorbents treating the fuel ranges from about 6 g/L to 24 g/L of the fuel.

Besides batch adsorption, granular particles of the adsorbents may be installed in a fixed bed or fluidized bed. For example, the fuel containing the sulfur compounds can be applied to a fixed bed column of the aluminum oxide nanoparticle doped activated carbon or carbon nanotubes, or a combination of the two, and the effluent of the column comprises the treated fuel with reduced concentrations of the sulfur compounds. In some embodiments, the fixed bed of the adsorbents comprises a cartridge for easy carry and use. For example, such a cartridge can be attached to the nozzle of a diesel pump and the fuel intake system of a diesel engine. Further, the cartridge can include other sulfur compound adsorbents such as a zeolite, activated alumina, and activated carbon.

Alternatively, one or more of the adsorbents can form a fluidized bed with the fuel containing the sulfur compounds, for example, by introducing the pressurized fuel through the particulate medium of the adsorbents. In the fluidized bed, contact between the adsorbents and the fuel is greatly enhanced as compared to a fixed bed column, leading to a higher removal efficiency of the sulfur compounds from the fuel.

Additionally, the adsorbents can take a variety of forms to facilitate removal of the sulfur compounds from the fuel and/or facilitate regeneration of the adsorbents. Non-limiting examples of the forms include granule, pellet, sphere, powder, woven fabric, non-woven fabric, mat, felt, block, and honeycomb. For example, the adsorbent(s) in powder form may be injected into a fuel storage tank and then removed by filtration or settling. The absorbents in fiber form may be inserted in a section of the fuel supply piping.

In one embodiment, the method of using the adsorbent to remove the sulfur compounds from the fuel further comprises regenerating the adsorption ability of the adsorbent. For example, multiple fixed bed columns of the adsorbent(s) can be set up to remove the sulfur compounds from the fuel in a parallel or sequential manner. Among them, the columns whose adsorption capacity has been exhausted are taken out of the sulfur compound removal operation for regeneration and replaced by the fresh or regenerated columns to make the removal operation continuous. In some embodiments, the regeneration of the adsorption ability of the adsorbent(s) comprises heating the adsorbents at about 150-700° C. to remove the adsorbed sulfur compounds. In other embodiments, the regeneration of the adsorption ability of the adsorbent(s) comprises heating the adsorbents at about 250-600° C. to remove the adsorbed sulfur compounds. In other embodiments, the regeneration of the adsorption ability of the adsorbent(s) comprises heating the adsorbents at about 300-550° C. to remove the adsorbed sulfur compounds. In still other embodiments, the regeneration of the adsorption ability of the adsorbent(s) comprises heating the adsorbents at about 350-500° C. to remove the adsorbed sulfur compounds.

In one embodiment, the adsorbent comprises activated carbon doped with nanoparticles of aluminum oxide, and the activated carbon doped with the nanoparticles of aluminum oxide has a BET surface area of greater than about 790 $m^2/g$. In another embodiment, the activated carbon doped with the nanoparticles of aluminum oxide has a BET surface area of greater than about 900 $m^2/g$. In another embodiment, the activated carbon doped with the nanoparticles of aluminum oxide has a BET surface area of greater than about 1200 $m^2/g$. In another embodiment, the activated carbon doped with the nanoparticles of aluminum oxide has a BET surface area of greater than about 1400 $m^2/g$. In another embodiment, the activated carbon doped with the nanoparticles of aluminum oxide has a BET surface area of greater than about 1600 $m^2/g$.

In one embodiment, the adsorbent comprises activated carbon doped with nanoparticles of aluminum oxide, and the activated carbon doped with the nanoparticles of aluminum oxide has a total pore volume of greater than about 0.39 $cm^3/g$. In another embodiment, the activated carbon doped with the nanoparticles of aluminum oxide has a total pore volume of greater than about 0.5 $cm^3/g$. In another embodiment, the activated carbon doped with the nanoparticles of aluminum oxide has a total pore volume of greater than about 0.6 $cm^3/g$. In another embodiment, the activated carbon doped with the nanoparticles of aluminum oxide has a total pore volume of greater than about 0.7 $cm^3/g$. In still another embodiment, the activated carbon doped with the nanoparticles of aluminum oxide has a total pore volume of greater than about 0.8 cm$^3$/g.

In one embodiment, the adsorbent comprises multi-walled carbon nanotubes doped with nanoparticles of aluminum oxide, and the multi-walled carbon nanotubes doped with the nanoparticles of aluminum oxide have a BET surface area of greater than about 115 m$^2$/g. In another embodiment, the multi-walled carbon nanotubes doped with the nanoparticles of aluminum oxide have a BET surface area of greater than about 140 m$^2$/g. In another embodiment, the multi-walled carbon nanotubes doped with the nanoparticles of aluminum oxide have a BET surface area of greater than about 160 m$^2$/g. In another embodiment, the multi-walled carbon nanotubes doped with the nanoparticles of aluminum oxide have a BET surface area of greater than about 180 m$^2$/g. In another embodiment, the multi-walled carbon nanotubes doped with the nanoparticles of aluminum oxide have a BET surface area of greater than about 200 m$^2$/g. In another embodiment, the multi-walled carbon nanotubes doped with the nanoparticles of aluminum oxide have a BET surface area of greater than about 220 m$^2$/g. In still another embodiment, the multi-walled carbon nanotubes doped with the nanoparticles of aluminum oxide have a BET surface area of greater than about 240 m$^2$/g.

In one embodiment, the adsorbent comprises multi-walled carbon nanotubes doped with nanoparticles of aluminum oxide, and the multi-walled carbon nanotubes doped with the nanoparticles of aluminum oxide have a total pore volume of greater than about 0.55 cm$^3$/g. In another embodiment, the multi-walled carbon nanotubes doped with the nanoparticles of aluminum oxide have a total pore volume of greater than about 0.7 cm$^3$/g. In another embodiment, the multi-walled carbon nanotubes doped with the nanoparticles of aluminum oxide have a total pore volume of greater than about 0.8 cm$^3$/g. In another embodiment, the multi-walled carbon nanotubes doped with the nanoparticles of aluminum oxide have a total pore volume of greater than about 1 cm$^3$/g. In still another embodiment, the multi-walled carbon nanotubes doped with the nanoparticles of aluminum oxide have a total pore volume of greater than about 1.2 cm$^3$/g.

In one embodiment, the method of removing the sulfur compounds from the fuel further comprises removing the sulfur compounds from the fuel by at least one removal method selected from the group consisting of hydrodesulfurization, biodesulfurization, oxidative desulfurization, and adsorptive desulfurization using at least one other adsorbent. For example, the method may further comprise ultrasonic assisted oxidative desulfurization (UAOD) (to oxidize DBT to DBTO$_2$) followed by adsorption with activated acidic alumina (to selectively remove DBTO$_2$). In this embodiment, the DBT that is not oxidized to DBTO$_2$ can be removed by the adsorbent(s) of the present disclosure to obtain the treated fuel with a low sulfur content. This embodiment of the method is advantageous, because in UAOD process the oxidation reactivity of the sulfur compounds in the fuel is in a decreasing order of 4,6-dimethyl-DBT>4-methyl-DBT>DBT>2-methyl-BT>BT. Removing non-oxidized DBT by the adsorbents of the present disclosure following one round of UAOD-acidic alumina adsorption process may obviate the need for, or reduce the number of, consecutive rounds of UAOD-acidic alumina adsorption process to obtain the low sulfur fuel. In an alternative embodiment, the fuel can first be treated with the adsorbents of the present disclosure to reduce the concentration of the DBT that is subsequently oxidized to DBTO$_2$ by the UAOD process. The DBTO$_2$ can then be preferentially adsorbed and removed by the activated acidic alumina, likewise resulting in the treated fuel with a low sulfur content.

Example 1

Preparation of Activated Carbon, Multi-Walled Carbon Nanotubes, and Graphene Oxide Doped with Nanoparticles of Aluminum Oxide ($Al_2O_3$)

Activated carbon (AC) and multi-walled carbon nanotubes (CNTs, purity 95%, OD: 10-20 nm, length 10-30 µm and specific surface area (SSA) 200 m$^2$/g) were purchased from Cenapro Chemical Corporation (Mandaue City, Philippine). Graphene oxide (GO) was prepared using the Hummers' Method.

AC, CNT, and GO were doped with $Al_2O_3$ by an incipient wetness impregnation method to make the $Al_2O_3$ impregnated carbonaceous materials containing 5% or 10% by total weight of aluminum (Al), designated as ACAL5, CNTAL5, and GOAL5 (having 5% by total weight of Al), and ACAL10, CNTAL10, and GOAL10 (having 10% by total weight of Al). To prepare the $Al_2O_3$ impregnated carbonaceous materials with 10% by total weight of Al, 15.3 g of $Al(NO_3)_3 \cdot 9H_2O$ were weighed accurately and dissolved in 400 mL of 1% deionized water/99% ethanol. 9.0 g of AC, CNT, or GO were added slowly to the $Al(NO_3)_3$ solution with stirring. The resulting mixture was ultra-sonicated for 2 hours using a sonicator (UP400S Hielscher-Ultrasound Technology) to obtain a homogeneous distribution of the aluminum salt on the surface of the carbonaceous material. The sonicated mixture was dried in an oven (Precision from Thermo Scientific) at 80° C. for 48 hours. The resulting solid material was ground and calcinated at 350° C. in a furnace (Lindberg blue M Thermo scientific) for 2 hours to form the $Al_2O_3$ impregnated carbonaceous material, which was stored in a tightly closed vial before being used in the experiments. Likewise, to prepare the $Al_2O_3$ impregnated carbonaceous materials with 5% by total weight of Al, 9.5 g of AC, CNT or GO were mixed with 6.95 g of $Al(NO_3)_3 \cdot 9H_2O$ dissolved in 400 mL of 1% deionized water/99% ethanol, followed by the same sonication, drying, grinding, and calcination procedures described above.

Example 2

Characterization of the AC, CNTs, and GO Impregnated with the Nanoparticles of Aluminum Oxide ($Al_2O_3$)

1. Thermal Gravimetric Analysis (TGA)/Differential Scanning Calorimetry (DSC)

Figure 4:
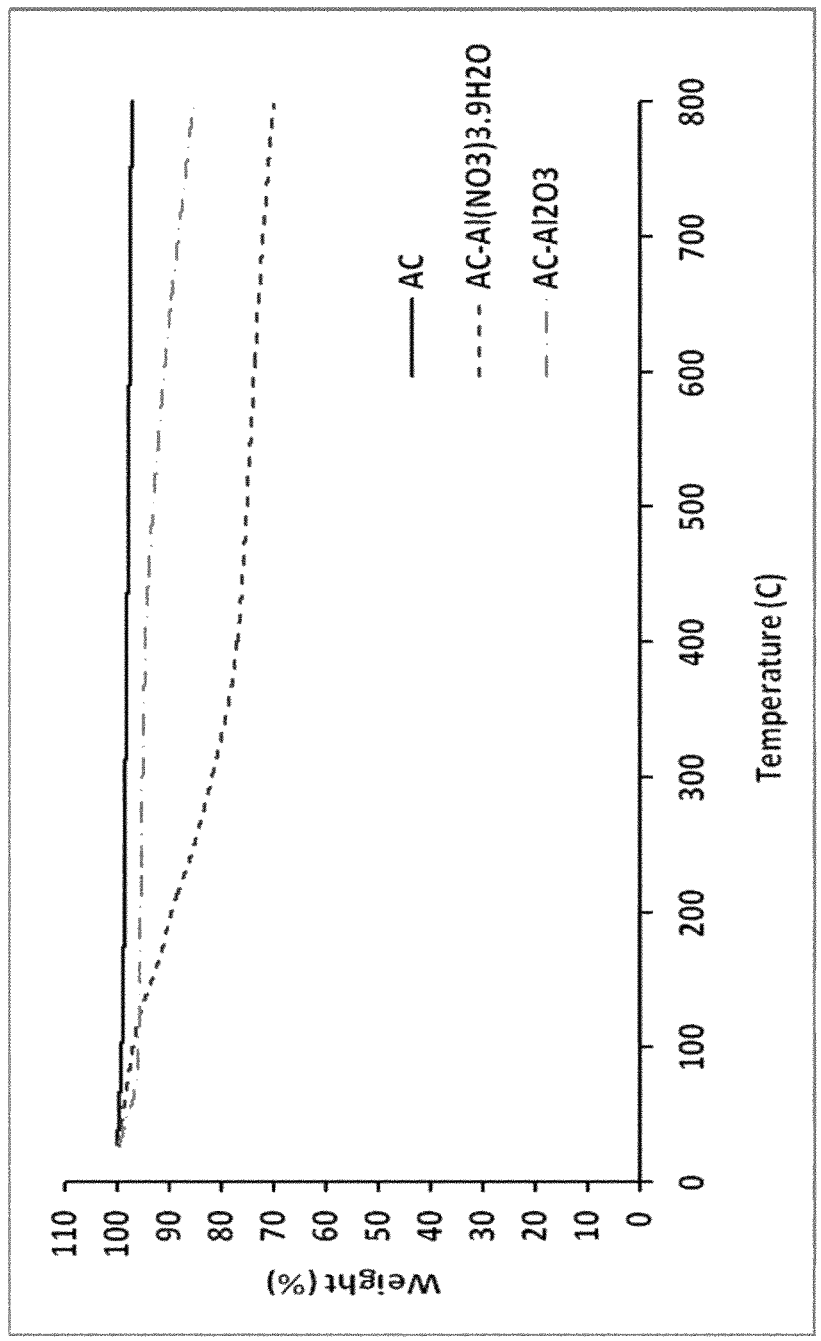
FIG. 4 is a graphical presentation of the thermal gravimetric analysis (TGA) performed with the raw AC, the AC-Al(NO$_3$)$_3$.9H$_2$O mixture without being calcinated, and the Al$_2$O$_3$ impregnated AC under nitrogen atmosphere according to Example 2.
Figure 5:
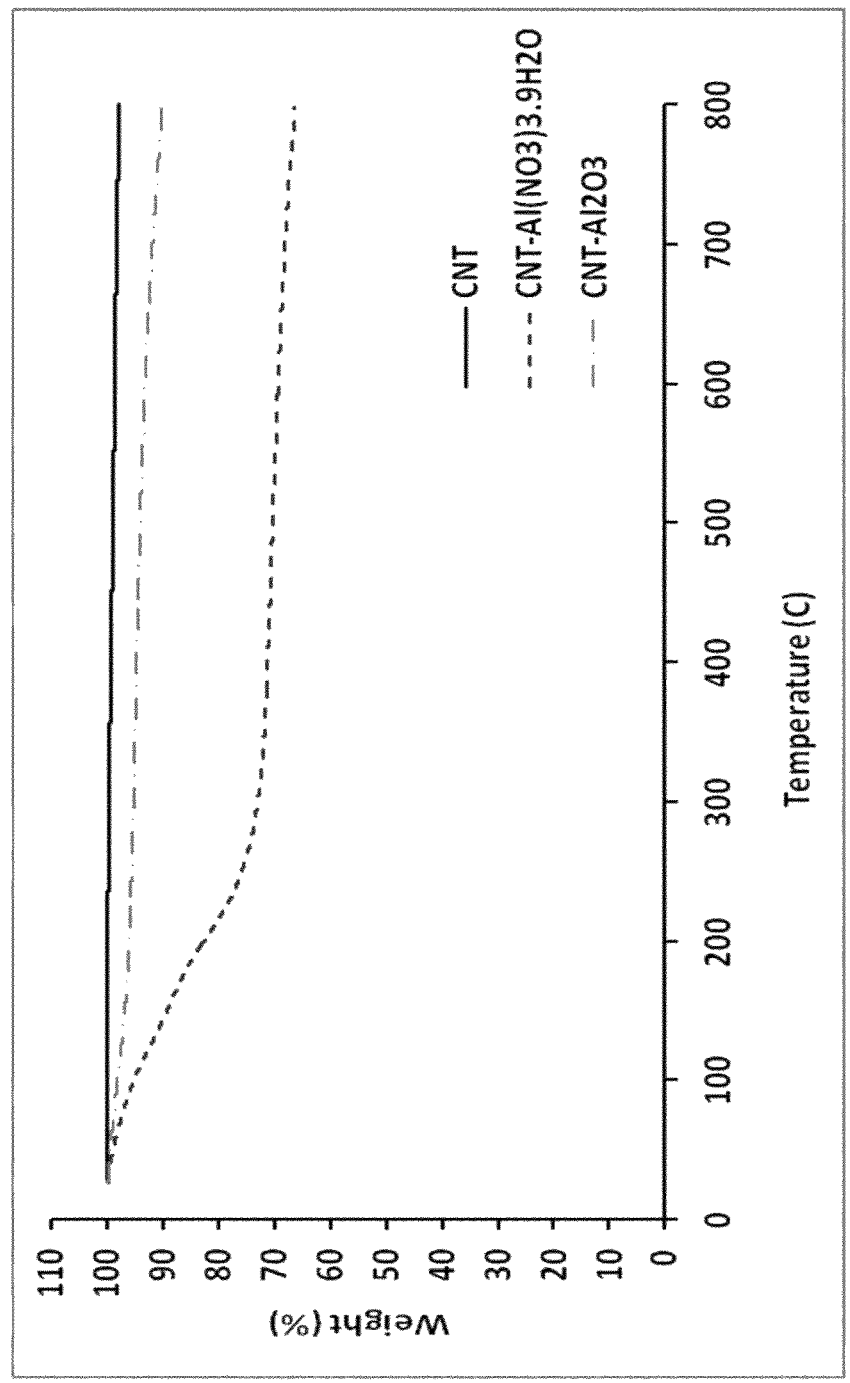
FIG. 5 is a graphical presentation of the thermal gravimetric analysis (TGA) performed with the raw CNTs, the $CNT-Al(NO_3)_3 \cdot 9H_2O$ mixture without being calcinated, and the $Al_2O_3$ impregnated CNTs under nitrogen atmosphere according to Example 2.
Figure 6:
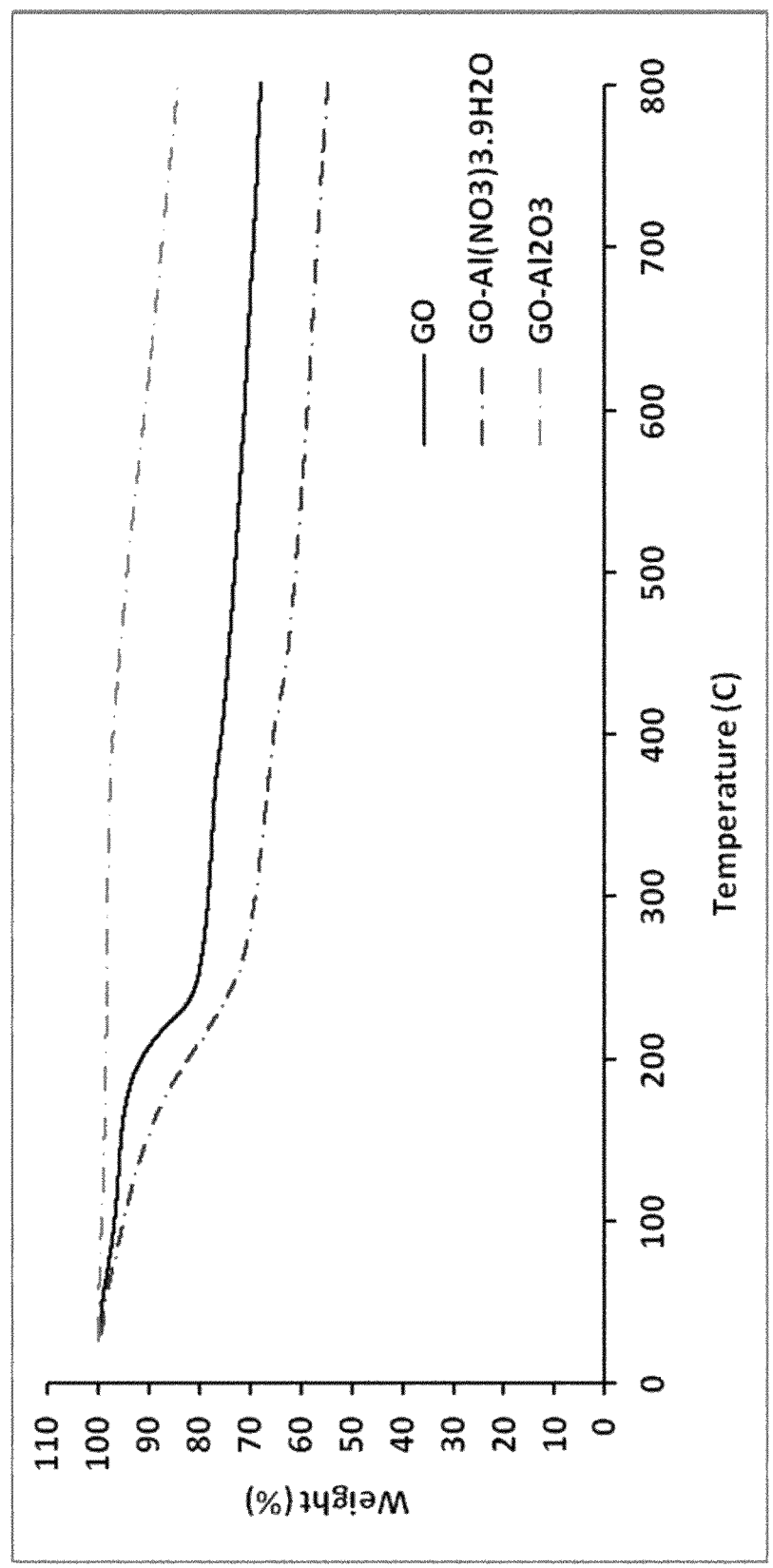
FIG. 6 a graphical presentation of the thermal gravimetric analysis (TGA) performed with the raw GO, the $GO-Al(NO_3)_3 \cdot 9H_2O$ mixture without being calcinated, and the $Al_2O_3$ impregnated GO under nitrogen atmosphere according to Example 2.

Thermal oxidation of the raw and $Al_2O_3$ impregnated AC, CNTs and GO was investigated by TGA/DSC (TA Instrument Q Series Q600 SDT) performed with 10 mg of each sample at a heating rate of 10° C./min and with the oxidation temperature increasing from 25 to 800° C. Referring to FIGS. 1-3, 10 mg of the raw AC, CNTs and GO were heated under atmospheric air with a flow rate of 100 mL/min. The residual solvent of each raw carbonaceous material was evaporated below 100° C. The initial oxidation temperatures of the raw AC, CNTs and GO were approximately 400° C., 550° C. and 500° C., respectively. The final oxidation temperatures of the raw AC, CNTs and GO were 600° C., 650° C., and 700° C., respectively. The AC, CNTs and GO impregnated with 10% by total weight of Al displayed similar TGA results as their raw counterparts, indicating that the aluminum oxide particles did not accelerate the oxidation of the impregnated carbonaceous materials. Another experiment was carried out to study the dehydration of aluminum nitrate nonahydrate and formation of aluminum oxide under atmospheric air. The aluminum nitrate nonahydrate started dehydrating at around 110° C. The resulting aluminum nitrate started calcination at 200° C. and completed the calcination at around 400° C. As shown in FIGS. 4-6, the dehydration of aluminum nitrate nonahydrate and its conversion to aluminum oxide on the different carbonaceous materials were also confirmed under nitrogen gas, with the results displaying the same trend as those under the atmospheric air.

2. Textural and Morphology Examination

Figure 9:
FIG. 9 is a scanning electron microscope (SEM) image of the raw GO according to Example 2.
Figure 7:
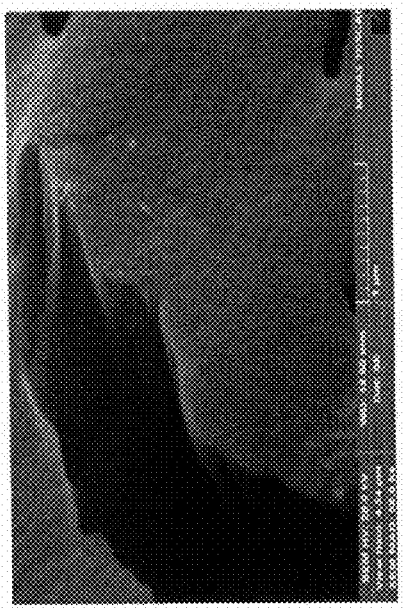
FIG. 7 is a scanning electron microscope (SEM) image of the raw AC according to Example 2.
Figure 8:
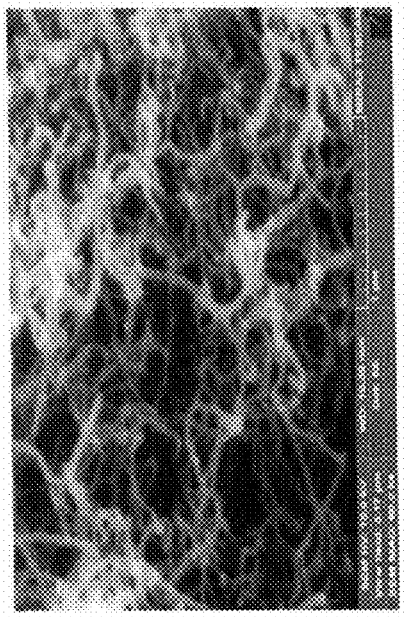
FIG. 8 is a scanning electron microscope (SEM) image of the raw CNTs according to Example 2.
Figure 12:
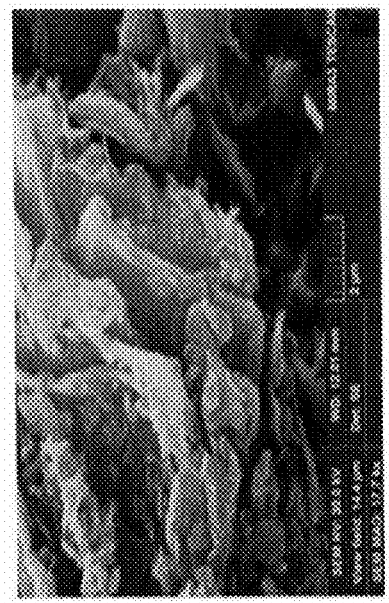
FIG. 12 is a scanning electron microscope (SEM) image of the $Al_2O_3$ impregnated GO according to Example 2.
Figure 10:
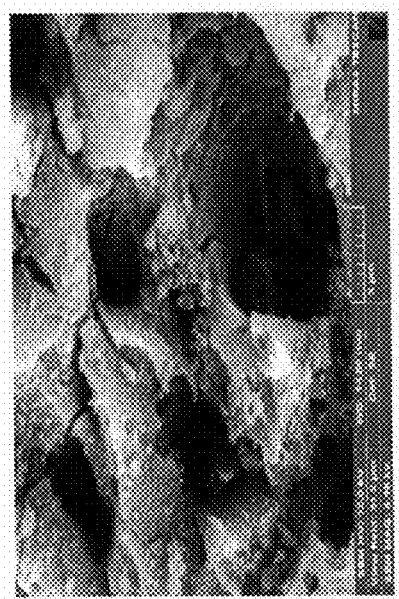
FIG. 10 is a scanning electron microscope (SEM) image of the $Al_2O_3$ impregnated AC according to Example 2
Figure 11:
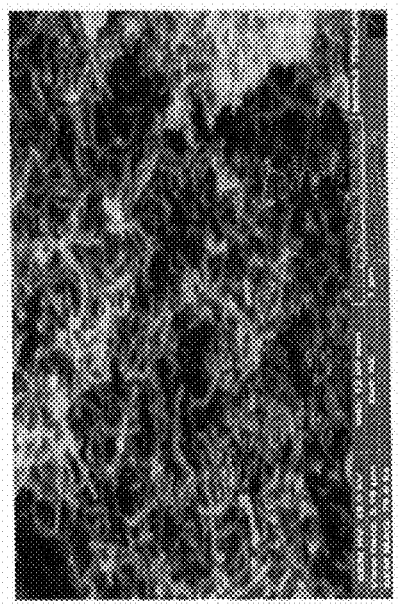
FIG. 11 is a scanning electron microscope (SEM) image of the $Al_2O_3$ impregnated CNTs according to Example 2.
Figure 14:
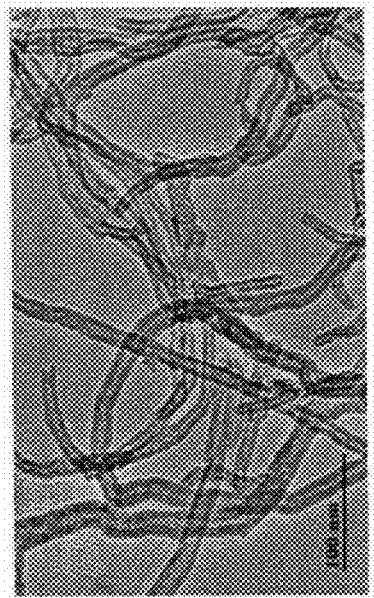
FIG. 14 is a field emission transmittance electron microscope (EF-TEM) image of the raw CNTs according to Example 2.

The morphology of the raw and $Al_2O_3$ impregnated AC, CNTs, and GO was characterized using the scanning electron microscope (SEM, TESCAN LYRA3) and field emission transmittance electron microscope (FE-TEM, JOEL-2100F). Referring to the SEM images in FIGS. 7-9, the size of the raw AC sheets varied from 300 to 500 microns with an average of 450 microns. The size of the raw GO sheets varied from 0.5 to 10.0 microns measured with SEM images at a low magnification (results not shown). The raw CNTs had an outer diameter of 10-30 nm and a length of 10-30 microns. After impregnation, a layer of $Al_2O_3$ particles covered the surface of the AC and GO sheets, and sphere-shaped $Al_2O_3$ particles covered the surface of the CNTs as shown in FIGS. 10-12.

The elemental compositions of the raw and $Al_2O_3$ impregnated carbonaceous materials were determined by energy dispersive X-ray analysis (EDX, Oxford detector model X-Max), with the results summarized in FIG. 13. The raw GO had a higher oxygen content by total weight than the raw AC and CNT due to the oxygenated functional groups on the raw GO surface. After the impregnation with the $Al_2O_3$ particles, the oxygen content of all three carbonaceous materials increased, and was more than the aluminum content in each $Al_2O_3$ impregnated carbonaceous material based on the total weight. Additionally, the actual aluminum content was close to the theoretical aluminum content of 5% or 10% of the total weight of each $Al_2O_3$ impregnated carbonaceous material.

Figure 15:
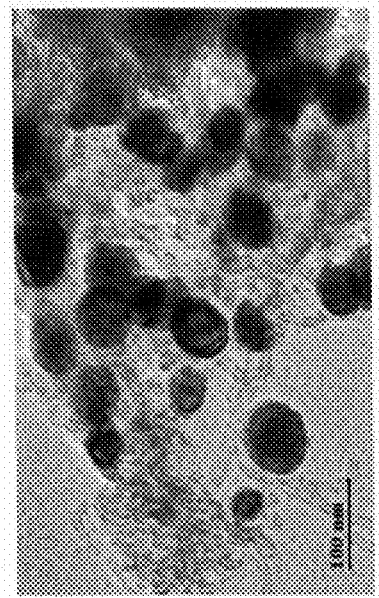
FIG. 15 is a field emission transmittance electron microscope (EF-TEM) image of the $Al_2O_3$ impregnated CNTs containing 10% of Al by total weight according to Example 2.
Figure 16:
FIG. 16 is a field emission transmittance electron microscope (EF-TEM) image of the raw GO, with the inset image showing the diffraction pattern of the surface of the raw GO according to Example 2.
Figure 17:
FIG. 17 is a field emission transmittance electron microscope (EF-TEM) image of the $Al_2O_3$ impregnated GO containing 10% of Al by total weight, with the inset image showing the diffraction pattern of the surface of the $Al_2O_3$ impregnated GO according to Example 2.

FE-TEM images for the raw and $Al_2O_3$ impregnated CNTs and GO are shown in FIGS. 14-17. FE-TEM was used to characterize the structures of the GO and the CNTs and to observe the $Al_2O_3$ particles impregnated on their surfaces. The CNTs were hollow and tubular in shape with many deflection sites. The GO, on the other hand, formed multi-layered stacked sheets. FIG. 15 shows the FE-TEM image of CNTs coated with $Al_2O_3$ nanoparticles. The $Al_2O_3$ nanoparticles had a diameter of 30-80 nm with spherical shapes and a crystalline structure. Comparing the diffraction patterns of the raw and $Al_2O_3$ impregnated GO, the $Al_2O_3$ impregnated GO sheets were covered with the $Al_2O_3$ nano-particles as shown in FIG. 17, whereas the raw GO sheets were not as shown in FIG. 16.

Figure 18:
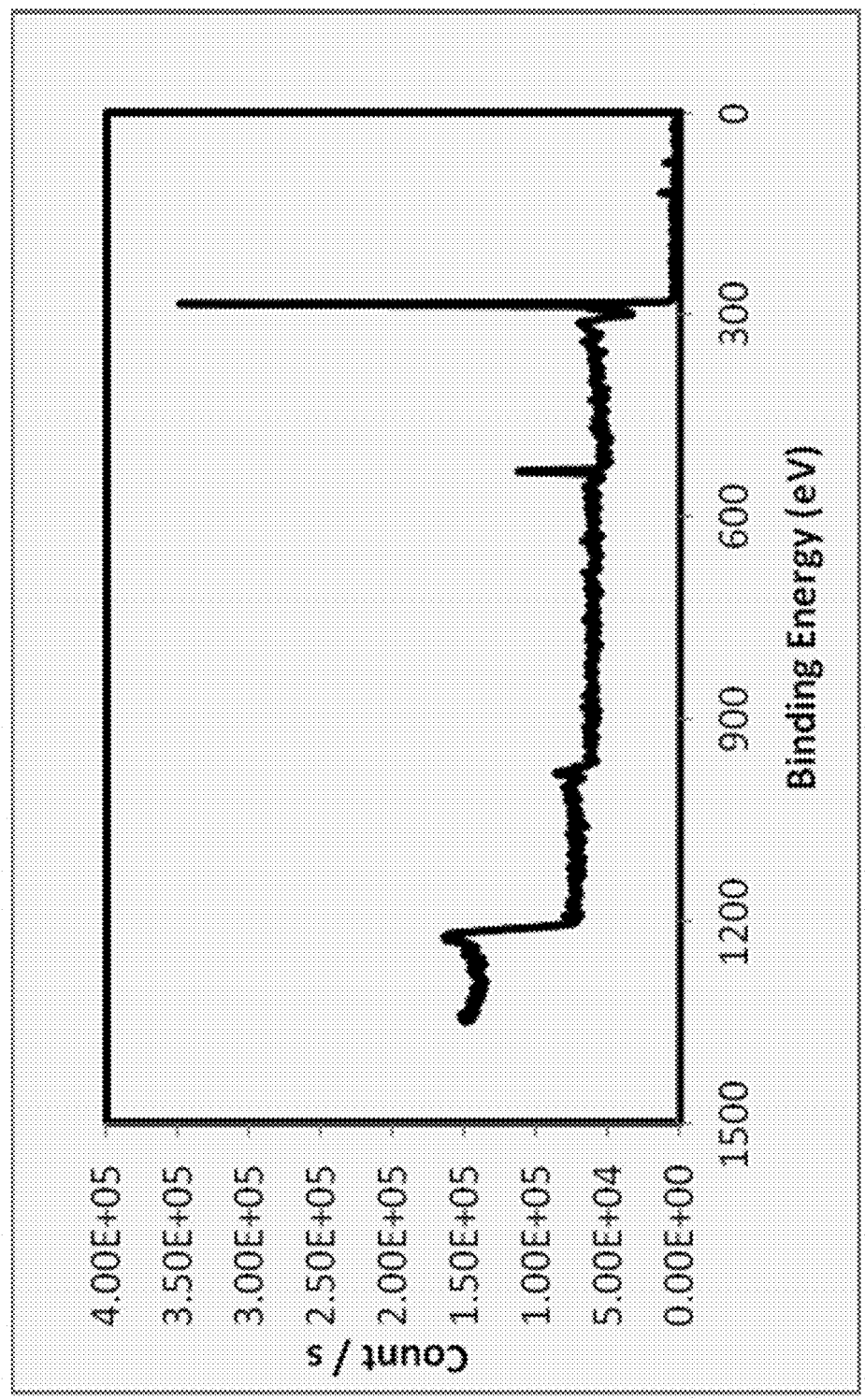
FIG. 18 is a graphical presentation of the XPS survey spectra of the $Al_2O_3$ impregnated CNTs according to Example 2.
Figure 19:
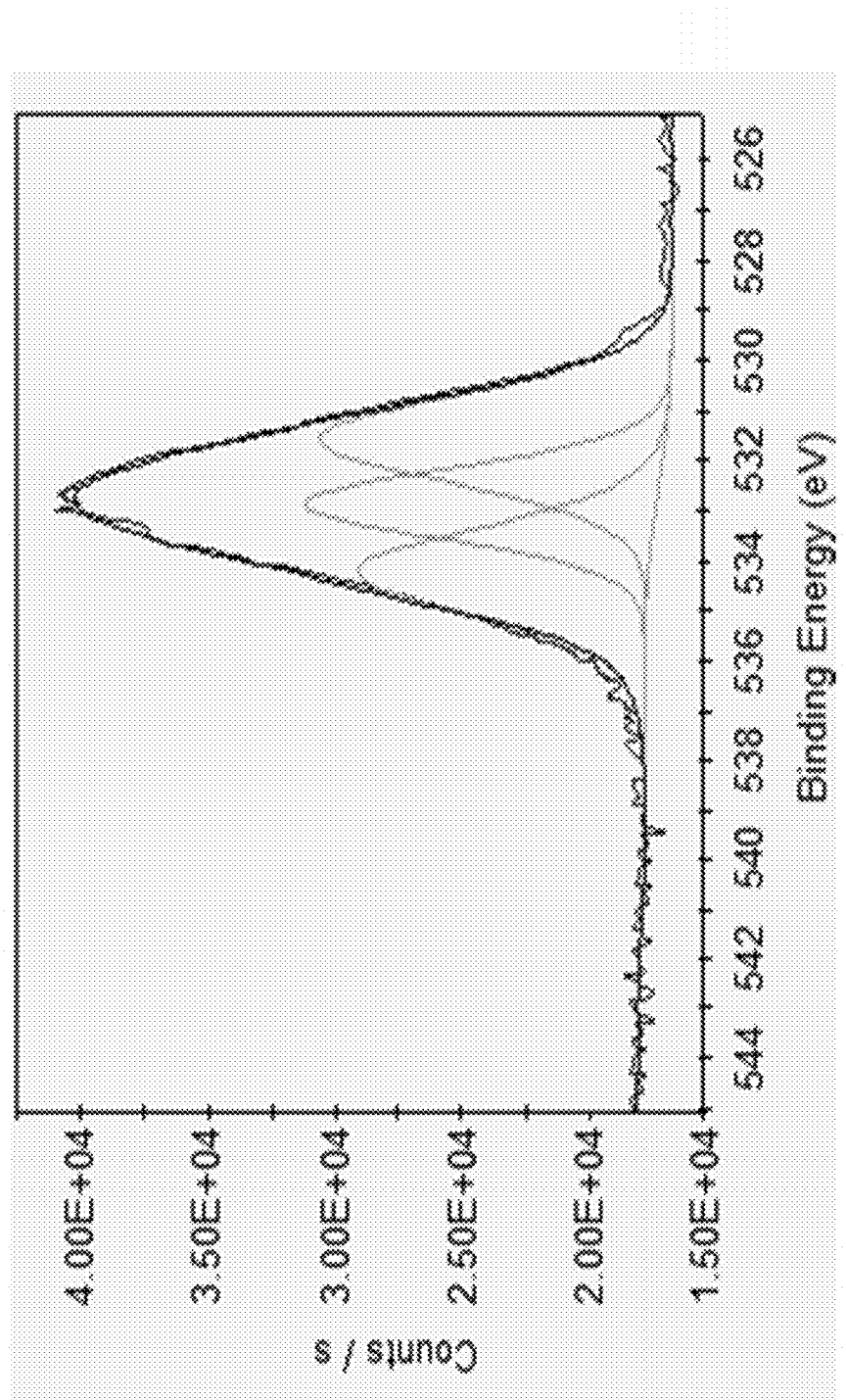
FIG. 19 is a graphical presentation of the O 1 s XPS spectra of the $Al_2O_3$ impregnated CNTs according to Example 2.
Figure 20:
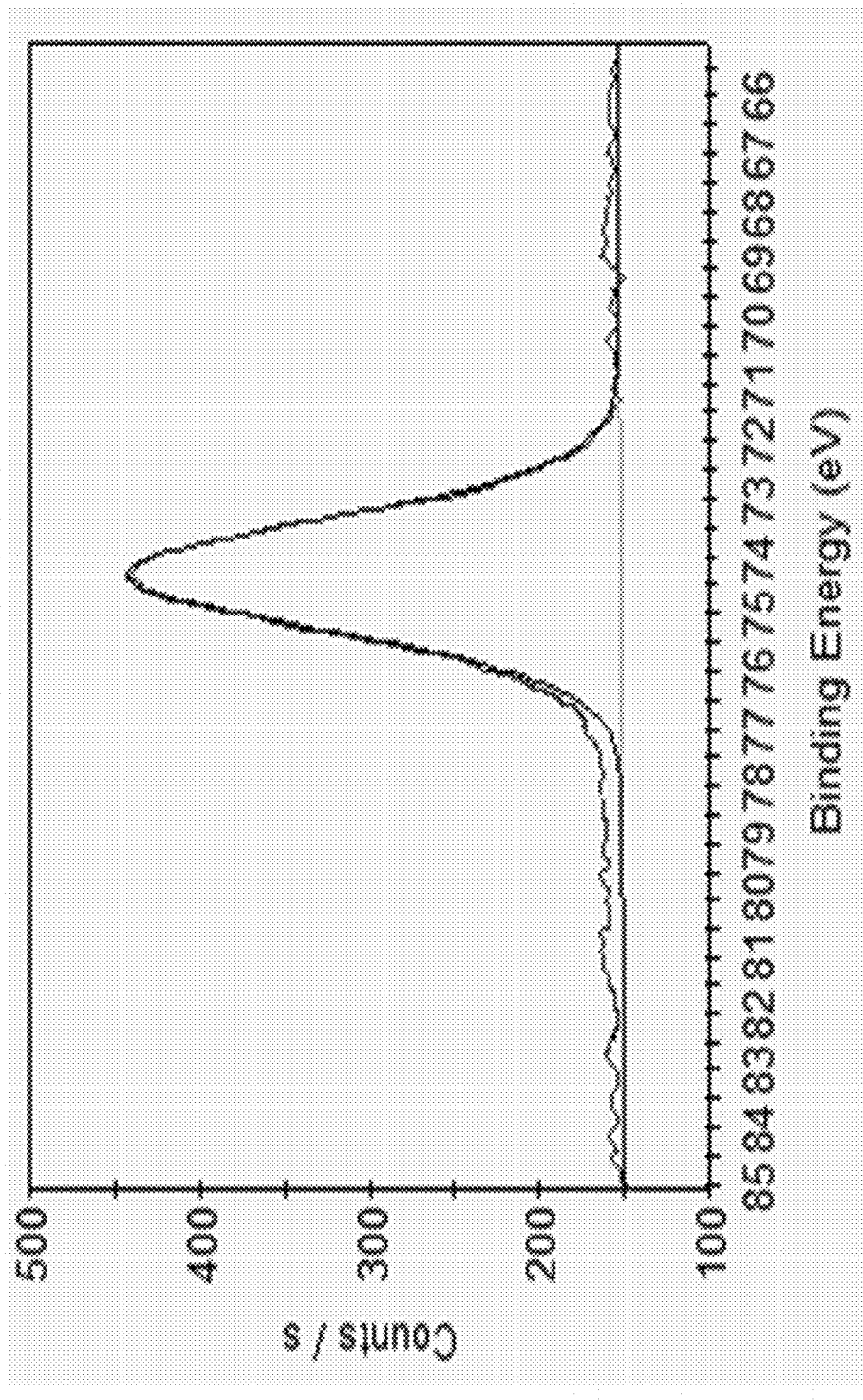
FIG. 20 is a graphical presentation of the Al 2p XPS spectra of the $Al_2O_3$ impregnated CNTs according to Example 2.

A qualitative analysis using an X-ray photoelectron spectrometer (XPS) (Thermo scientific ESCALAB 250Xi) further confirmed the presence of $Al_2O_3$ on the CNTs. FIG. 18 shows the XPS survey spectrum, and FIGS. 19 and 20 show the single element scans for O 1s and Al 2p, respectively. The peak binding energies observed at 74.6 and 531.4 eV matched the binding energies for Al 2p and O 1s in $Al_2O_3$, respectively, based on the reported values in the XPS fitting online library.

3. Determination of the Surface Area, Total Pore Volume, and Surface pH of the Raw and $Al_2O_3$ Impregnated Carbonaceous Materials The surface area and porosity of the raw and $Al_2O_3$ impregnated carbonaceous materials were analyzed using automated gas sorption analyzer (Autosorb iQ Quantachrome USA) in the relative pressure from 0.10 to 1.00. The liquid nitrogen adsorption desorption isotherms were measured after degassing all the adsorbents at 200° C. and at $6.5 \times 10^{-5}$ Torr. About 0.25 g of each sample was used for this analysis. The Brunauer-Emmett-Teller (BET) and the density functional theory (DFT) methods were used to calculate the surface area (SA). The total pore volume (V) was calculated from the DFT method only.

The surface pH of the raw and $Al_2O_3$ impregnated carbonaceous materials was measured by suspending 0.20 g of each dried material in 10 ml of distilled water followed by sonication for 2 hours. The sonicated suspension was filtered, and the pH of the filtrated solution was measured using a pH meter (Thermo Scientific CyberScan pH 1500).

Referring to FIG. 21, the raw AC had a much higher surface area (SA) than the raw CNTs and raw GO, however, the raw CNTs had a larger total pore volume (V) than the raw AC and GO. Except for GOAL10, the surface areas and the total pore volumes of the carbonaceous materials decreased after the impregnation with the $Al_2O_3$ nano-particles, however, the acidity of the surfaces of the carbonaceous materials increased. This decrease in the surface area and porosity can be explained by the accumulation of the $Al_2O_3$ nano-particles.

Example 3

Adsorption of Thiophene and Dibenzothiophene (DBT) with the Raw and $Al_2O_3$ Impregnated Carbonaceous Materials Thiophene and DBT concentrations were measured before and after the adsorption using an HPLC-UV system (Agilent Technology 1260 Infinity series). The chromatographic parameters are summarized in FIG. 22.

The stock solutions for thiophene, DBT, and naphthalene (Naph) were prepared by accurately weighing and dissolving 25 mg of thiophene, 25 mg of DBT, and 100 mg of Naph individually in 100 mL of n-hexane. The stock solutions were used to prepare a calibration curve with concentrations ranging from 2.5 to 250 mg/L for both thiophene and DBT, and from 10 to 1000 mg/L for Naph. Ternary mixtures with the same corresponding concentration ranges were also prepared to study the effect of co-presence of the three compounds on the linearity of the calibration curve of each individual compound. Three sets of calibration curves with three replicates at each calibration point for each individual compound and another one set of calibration curve for the ternary mixture of thiophene, DBT and Naph were prepared. Thiophene and DBT solutions at three different concentrations of 7.5, 125, and 225 mg/L were prepared for quality control, and at three additional concentrations of 30, 500, and 900 mg/L were prepared to study the relative recovery, precision and accuracy of the method over the entire linear working ranges and later to check the system precision during the analysis stage.

Figure 23:
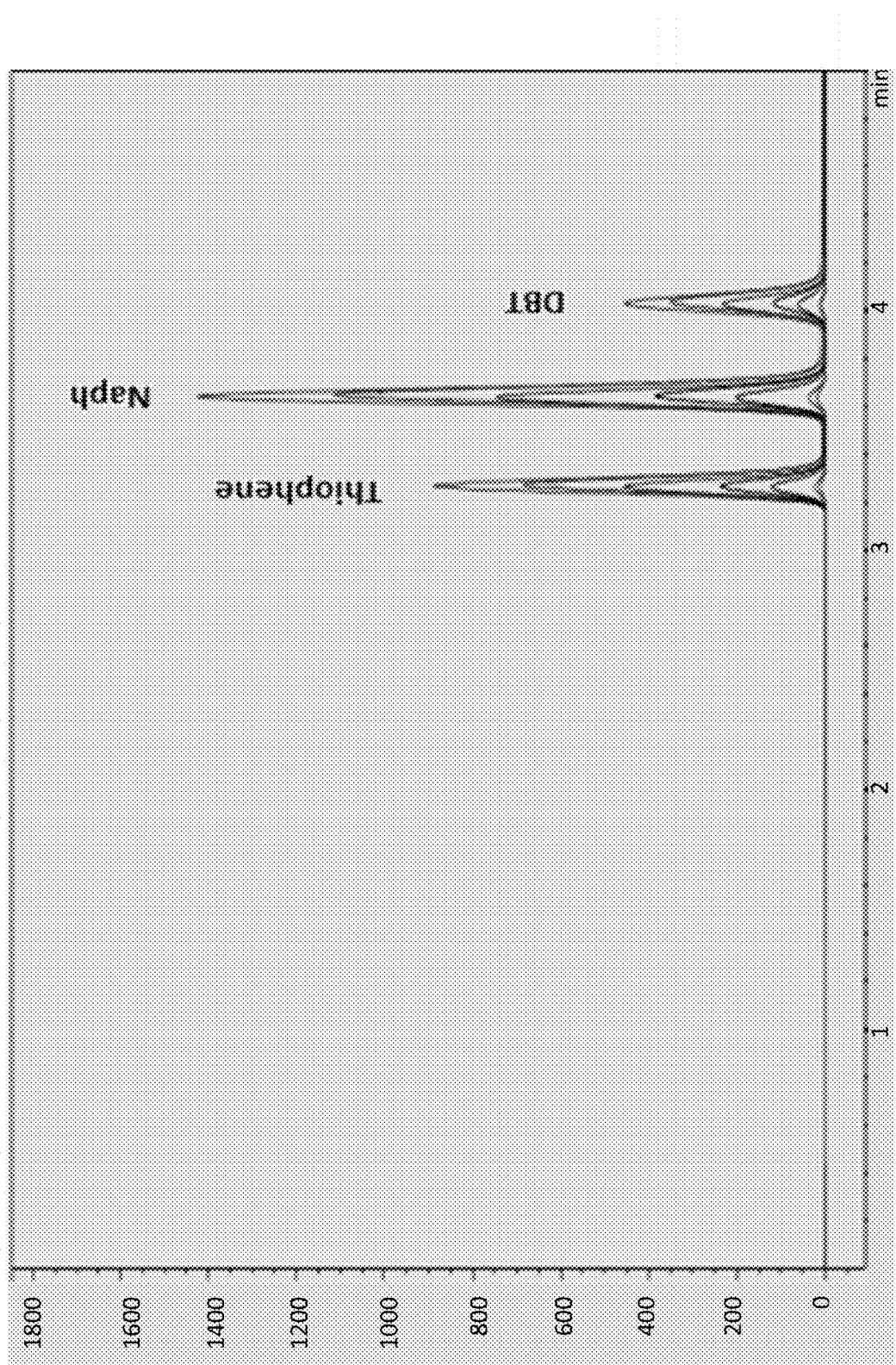
FIG. 23 is a graphical presentation of the overlaid chromatograms of the calibration curve points for thiophene, DBT and Naph according to Example 3.
Figure 24:
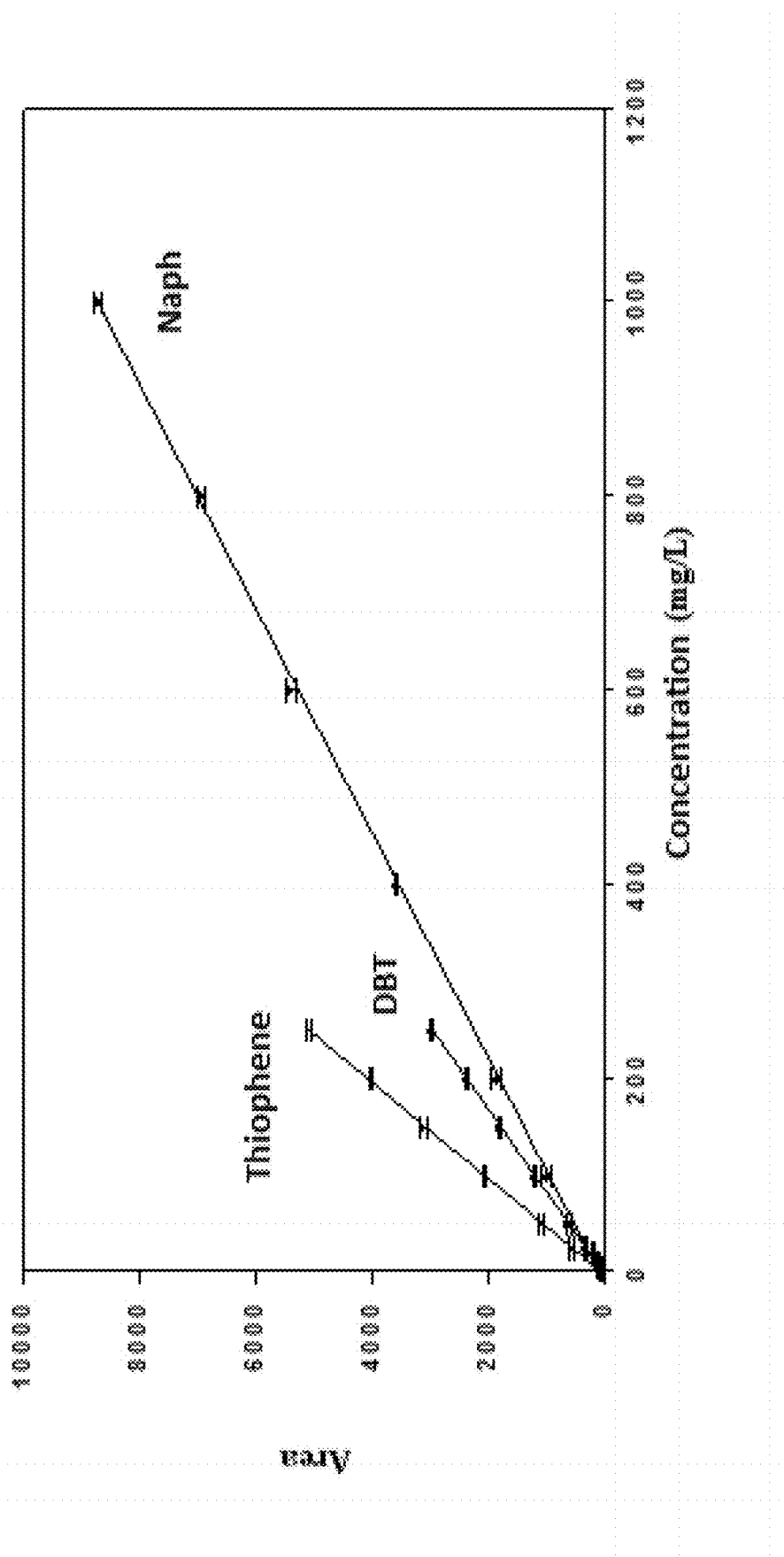
FIG. 24 is a graphical presentation of the calibration curves for thiophene, DBT and Naph, with the error bars representing the SD of three replicate samples according to Example 3.
Figure 25:
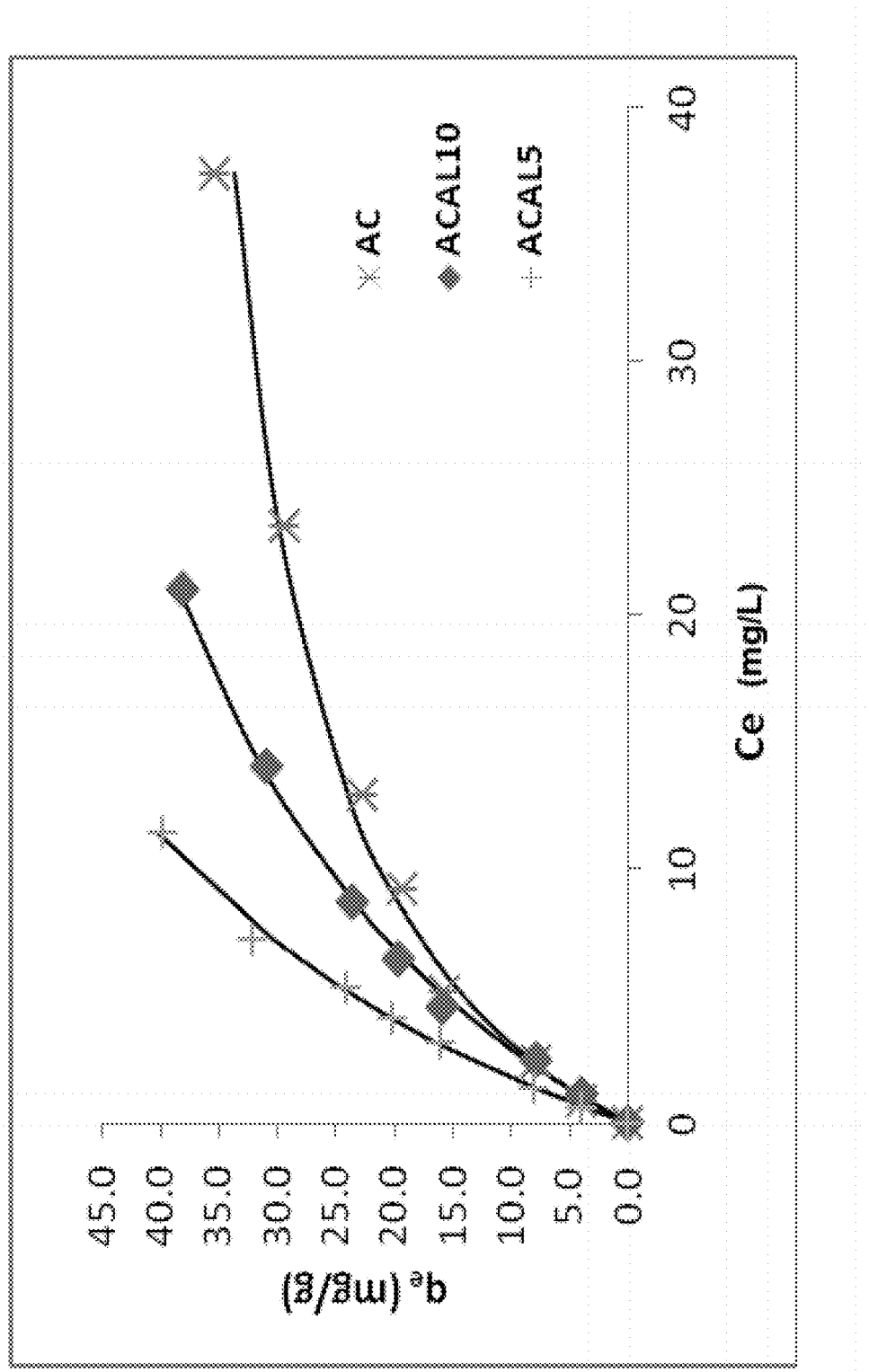
FIG. 25 is a graphical presentation of the adsorption isotherms fitted by the Langmuir model of AC, ACAL5 and ACAL10 for DBT adsorption. The adsorption temperature is 25° C. and the shaking speed is 200 rpm according to Example 3.
Figure 26:
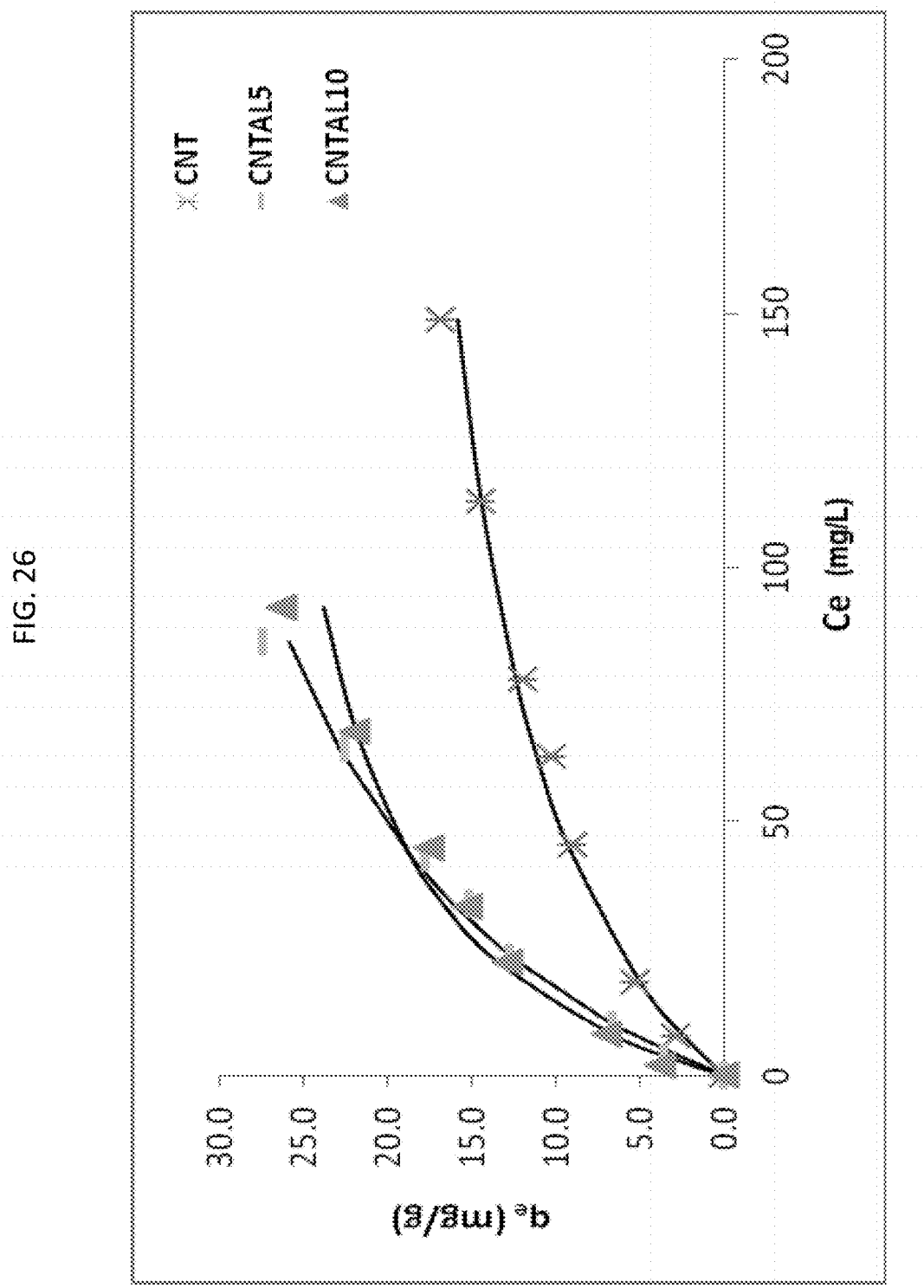
FIG. 26 is a graphical presentation of the adsorption isotherms fitted by the Langmuir model of CNT, CNTAL5 and CNTAL10 for DBT adsorption. The adsorption temperature is 25° C. and the shaking speed is 200 rpm according to Example 3.
Figure 27:
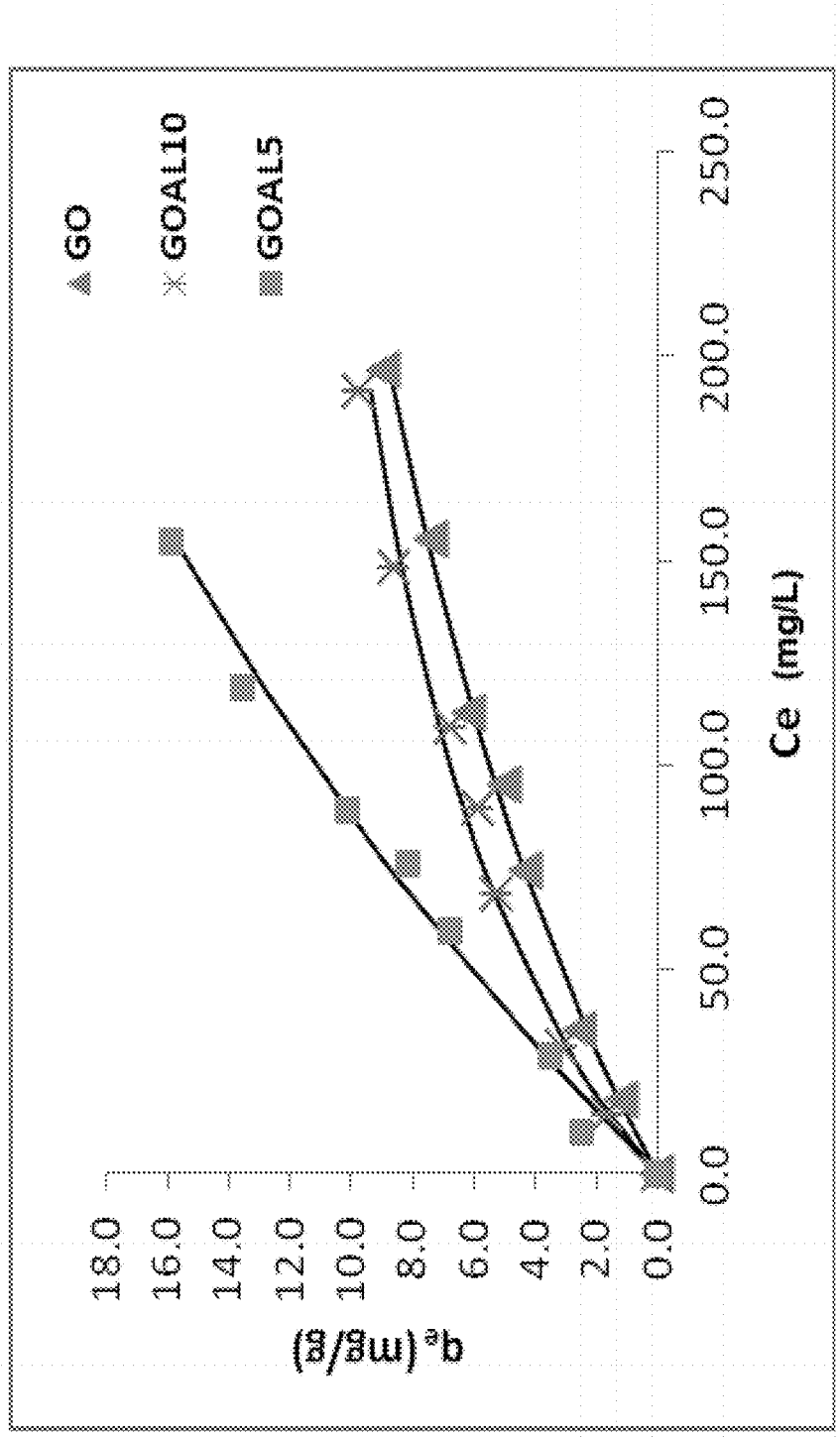
FIG. 27 is a graphical presentation of the adsorption isotherms fitted by the Langmuir model of GO, GOAL5 and GOAL10 for DBT adsorption. The adsorption temperature is 25° C. and the shaking speed is 200 rpm according to Example 3.
Figure 28:
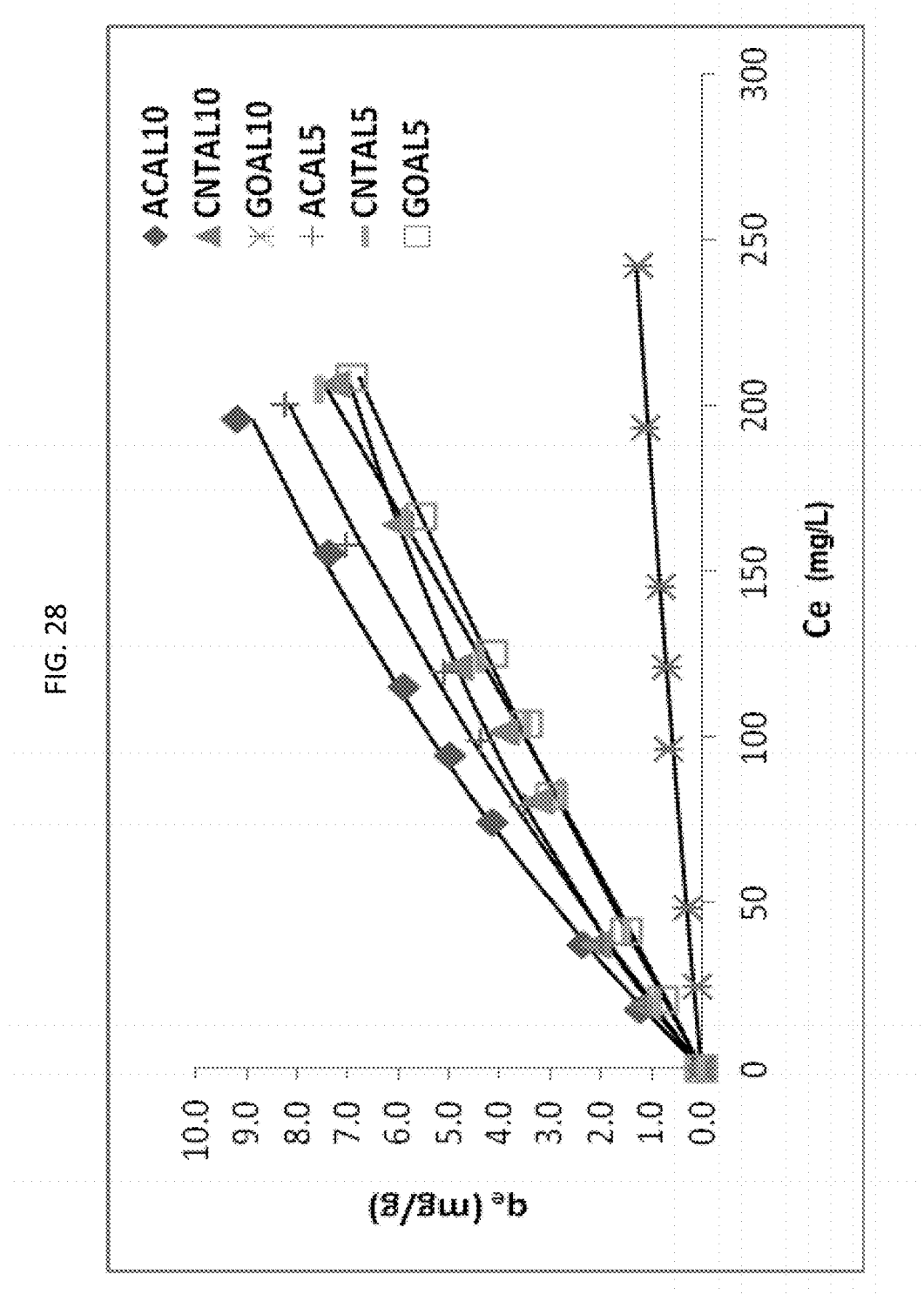
FIG. 28 is a graphical presentation of the adsorption isotherms fitted by the Langmuir model of ACAL5, ACAL10, CNTAL5, CNTAL10, GOAL5, and GOAL10 for thiophene adsorption. The adsorption temperature is 25° C. and the shaking speed is 200 rpm according to Example 3.
Figure 29:
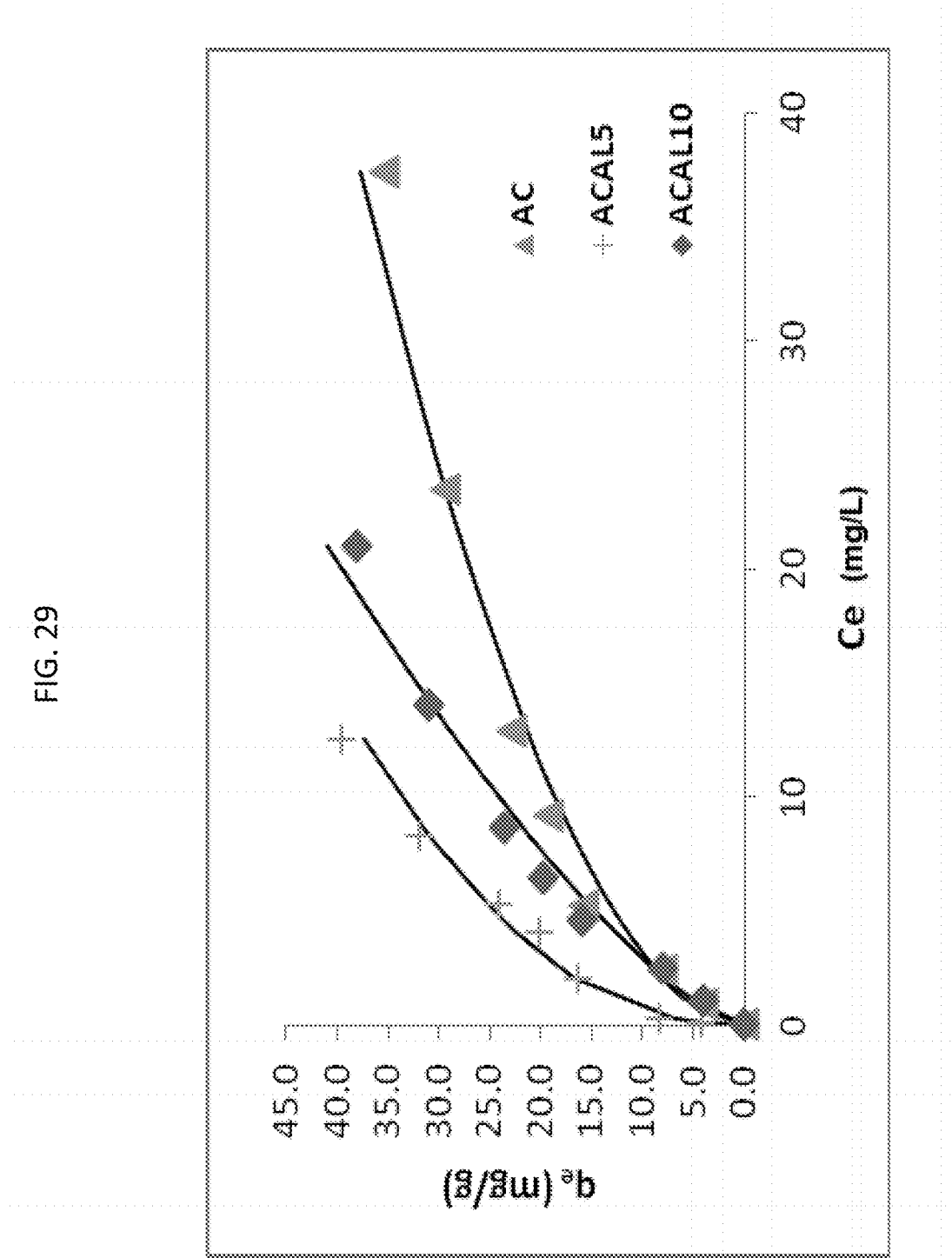
FIG. 29 is a graphical presentation of the adsorption isotherms fitted by the Freundlich model of AC, ACAL5 and ACAL10 for DBT adsorption. The adsorption temperature is 25° C. and the shaking speed is 200 rpm according to Example 3.
Figure 30:
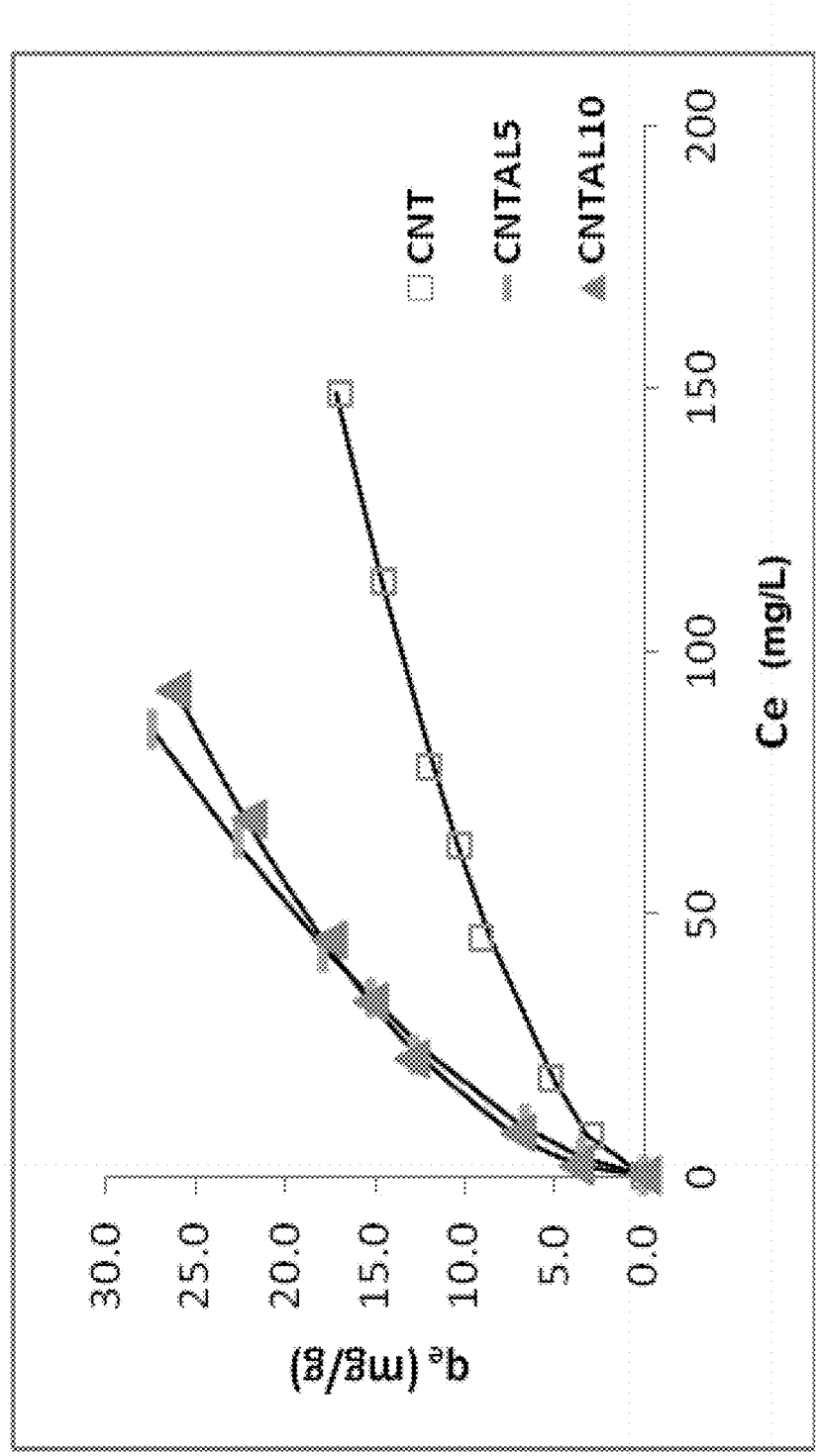
FIG. 30 is a graphical presentation of the adsorption isotherms fitted by the Freundlich model of CNT, CNTAL5 and CNTAL10 for DBT adsorption. The adsorption temperature is 25° C. and the shaking speed is 200 rpm according to Example 3.
Figure 31:
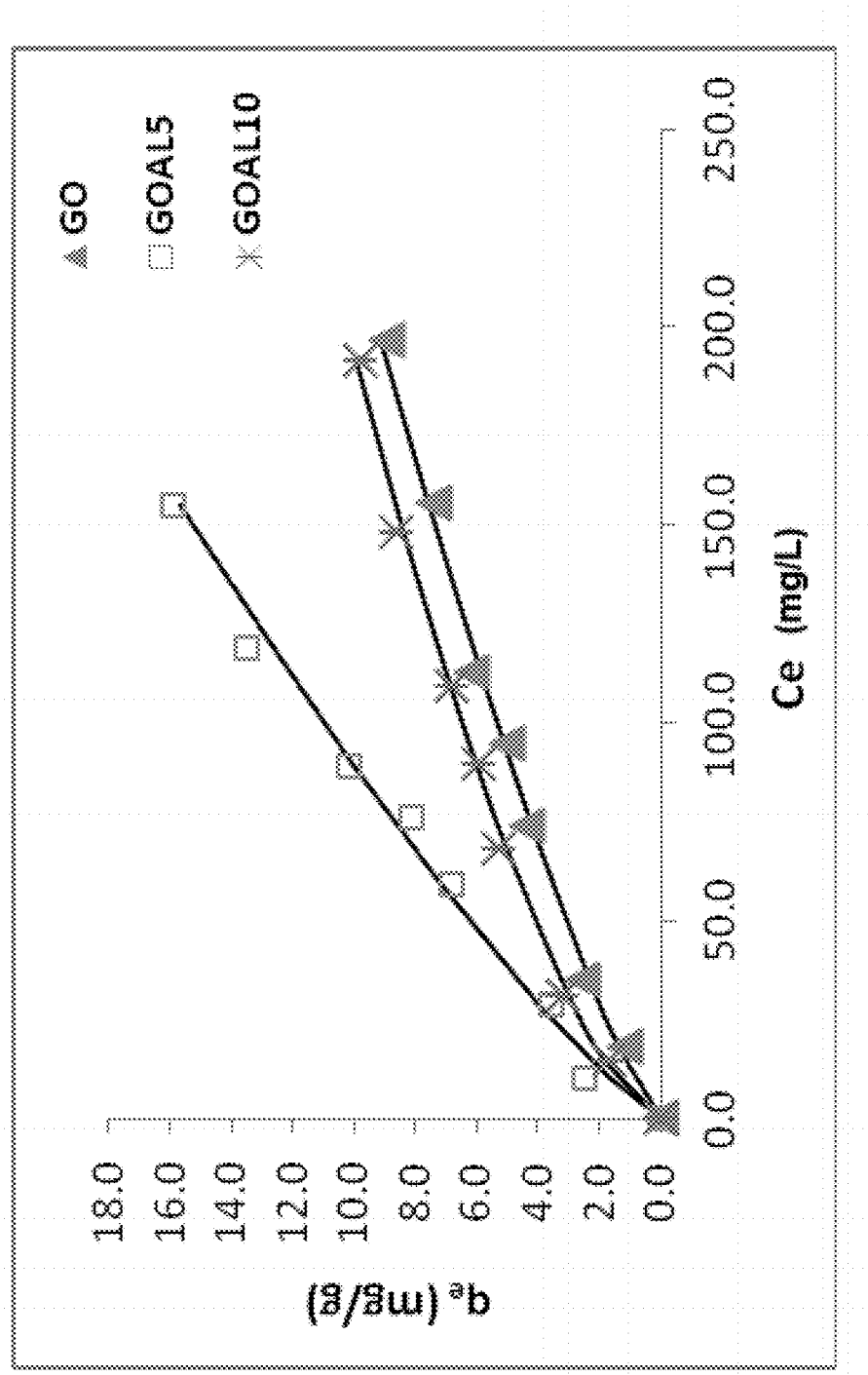
FIG. 31 is a graphical presentation of the adsorption isotherms fitted by the Freundlich model of GO, GOAL5 and GOAL10 for DBT adsorption. The adsorption temperature is 25° C. and the shaking speed is 200 rpm according to Example 3.
Figure 32:
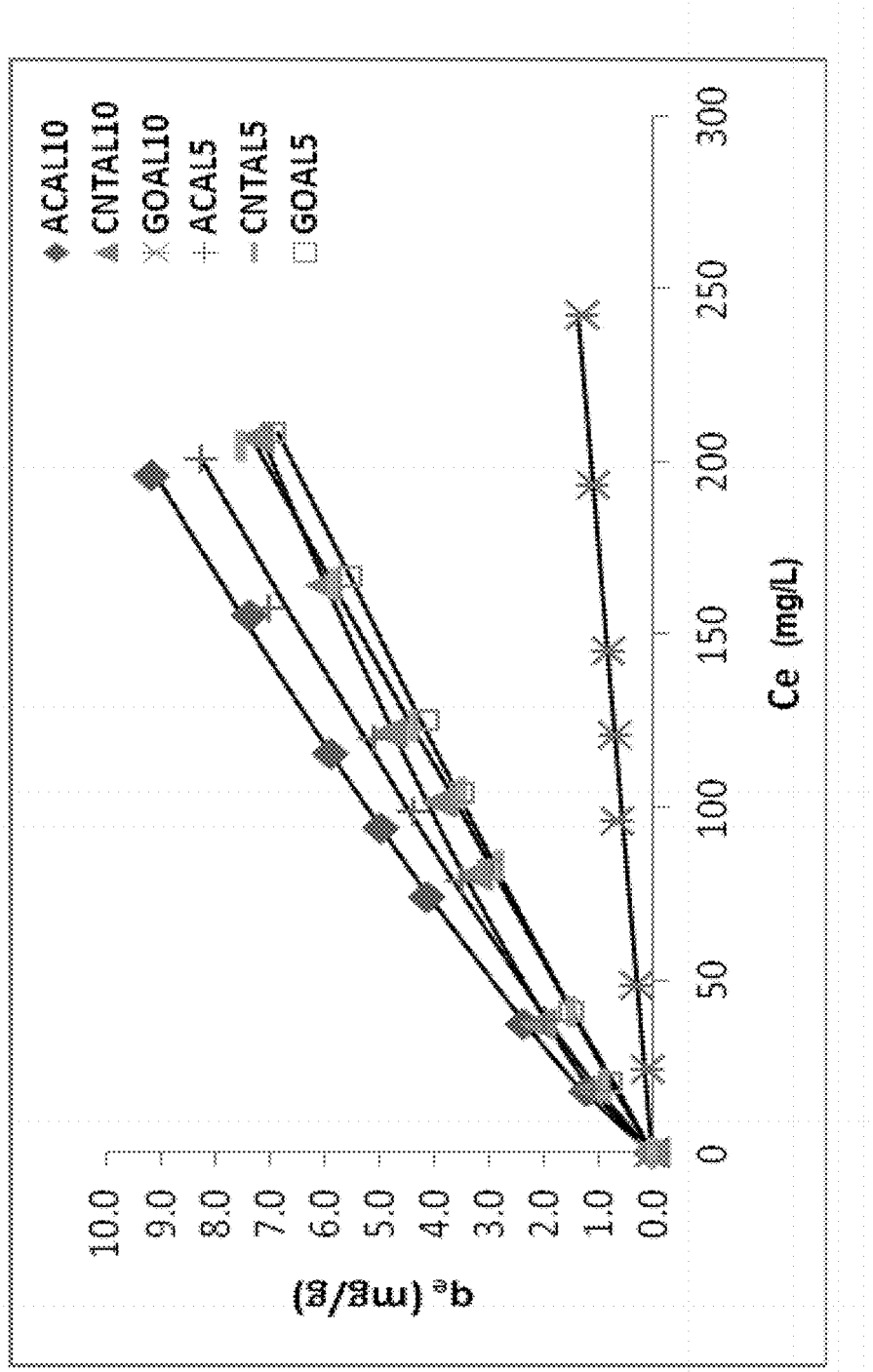
FIG. 32 is a graphical presentation of the adsorption isotherms fitted by the Freundlich model of ACAL5, ACAL10, CNTAL5, CNTAL10, GOAL5, and GOAL10 for thiophene adsorption. The adsorption temperature is 25° C. and the shaking speed is 200 rpm according to Example 3.

The screen shot of the overlaid chromatograms for the calibration points were shown in FIG. 23. The linear working range for both thiophene and DBT shown in FIG. 24 was from 2.5 to 250 mg/L with the coefficients of determination ($R^2$) of 0.9997, 0.9998, and 0.9996 for thiophene, DBT, and Naph, respectively. The precisions of the method over the entire concentration ranges based on the relative standard deviation (RSD %) for thiophene, DBT and Naph were 0.58-2.64%, 0.70-3.22%, and 0.71-5.19%, respectively. The accuracies based on the relative error (RE %) for thiophene, DBT and Naph were −1.27-4.95%, −0.53-5.15%, and −1.30-5.42%, respectively.

The adsorption of thiophene and DBT by the raw and $Al_2O_3$ impregnated AC, CNTs and GO with 5% and 10% by total weight of Al was investigated at room temperature (T=25° C.). Different concentrations of thiophene and DBT (i.e. 25, 50, 100, 125, 150, 200 and 250 mg/L) were dissolved in 25 mL of n-hexane as a model diesel, while the amount of each adsorbent was fixed at 150 mg. The concentrations of thiophene and DBT before and after the adsorption were measured using HPLC coupled with a UV detector. In the selectivity study in Example 6, the wavelength switching mode was used to measure the concentrations of thiophene, Naph and DBT simultaneously in the model diesel. FIGS. 25-32 show the adsorption isotherms of DBT and thiophene with ACAL5, ACAL10, CNTAL5, CNTAL10, GOAL5, and GOAL10 fitted by the Langmuir and Freundlich isotherm models. The Langmuir model describes the adsorption on a homogeneous adsorbent surface with the same adsorption energy without repulsion or attraction between the adsorbate molecules at the adsorption sites, whereas the Freundlich model assumes that the adsorption takes place at a heterogeneous adsorbent surface with multi-layered adsorption capacity.

According to the Langmuir Model $$q_e = \frac{(Q_o b C_e)}{(1 + b C_e)} \quad (1)$$

According to the Freundlich Model:

$$q_e = K_F C_e^{1/n} \quad (2)$$

Equation (1) can be rearranged to give the following linear form:

$$\frac{C_e}{q_e} = \frac{1}{bQ_0} + \frac{C_e}{Q_0}\frac{C_e}{q_e} = \frac{1}{bQ_0} + \frac{C_e}{Q_0} \quad (3)$$

The linear form of Equation (2) can be written as:

$$\ln(q_e) = \ln(K_F) + \frac{1}{n}\ln(C_e) \quad (4)$$

where $q_e$ (mg/g) is the adsorption capacity at equilibrium, $Q_o$ (mg/g) is the maximum monolayer adsorption capacity, b is the Langmuir constant and $C_e$ (mg/L) is the concentration of a sulfur compound in the solution at equilibrium, $K_F$ is the Freundlich constant, and n is the heterogeneity parameter which indicates the degree of the adsorbents surface heterogeneity. The $q_e$ can be calculated using the following Equation (5):

$$q_e = \frac{V(C_o - C_e)}{(m)} \quad (5)$$

Where V (mL) is the volume of solution in the adsorption experiment, $C_o$ (mg/L) is the initial concentration of the sulfur compound in the solution, and m (mg) is the mass of an adsorbent. The maximum monolayer adsorption capacities ($Q_o$) for each adsorbent were obtained from the slope of the linear Langmuir isotherm (Equation 3). The n values for all adsorbents were obtained from the slope of the linear Freundlich isotherm (Equation 4). The n and $K_F$ indicate the degree of surface heterogeneity and adsorption capacity, respectively. A smaller n value corresponds to lower heterogeneity on the adsorbents surface, while a larger $K_F$ corresponds to higher adsorption capacity.

As shown in FIG. 33A, the n and $K_F$ values of the $Al_2O_3$ impregnated adsorbents for thiophene adsorption were larger than those of their raw counterparts, indicating that the $Al_2O_3$ impregnation increased the adsorbents surface heterogeneity and adsorption capacity for thiophene. However, there was no significant change in the n values of the $Al_2O_3$ impregnated adsorbents for DBT adsorption as compared to their raw counterparts. That all of the n values were greater than 1 indicates the tendency of DBT for adsorption. Compared to their raw counterparts, the $Al_2O_3$ impregnated adsorbents had increased $K_F$ values, indicating their higher adsorption capacity for DBT.

The goodness of fit values ($R^2$) of the linear Freundlich adsorption isotherm were overall greater than those of the linear Langmuir adsorption isotherm for the thiophene and DBT adsorption. Additionally, the experimental data for the thiophene adsorption with AC, CNTs, GO, CNTAL5, GOAL10 and GOAL5 did not fit the Langmuir adsorption isotherm. Thus, thiophene and DBT were likely adsorbed by forming multiple layers on the adsorbents.

Referring to FIG. 33B, the maximum monolayer adsorption capacities ($Q_o$) of AC, ACAL10 and ACAL5 for DBT obtained from the Langmuir isotherm were higher than those of their respective CNT-based counterparts, i.e. CNT, CNTAL10 and CNTAL5, which nonetheless had higher Qo values than those of their respective GO-based counterparts, i.e. GO, GOAL10 and GOAL5. Notably, the Qo values of ACAL5 and CNTAL5 were almost twice the Qo values of their respective raw counterparts AC and CNTs. Likewise, the Qo values of ACAL10 and CNTAL10 were almost 50% higher than the Qo values of their respective raw counterparts AC and CNTs. By contrast, the Qo of GOAL10 was lower than the Qo of GO, probably because of agglomeration of multi-layered graphene oxide sheets after the impregnation with a high percentage of $Al_2O_3$. ACAL5 had the highest monolayer adsorption capacity (84.47±0.77 mg/g) for DBT followed by, in descending order, ACAL10, AC, CNTAL5, CNTAL10, GOAL5, CNTs, GO, and GOAL10. In each carbonaceous material group of the adsorbents, the change in the adsorption capacity of the $Al_2O_3$ impregnated adsorbents for DBT in the model diesel as compared to their raw counterpart correlated better with the acidity of the adsorbents surface than with the changes in the BET surface area or the total pore volume. The amphoteric nature of $Al_2O_3$ makes it act as an acid in presence of a base. Since DBT is a Lewis base, $Al_2O_3$ may improve the adsorption of DBT through acid-base interaction.

Example 4

Figure 34:
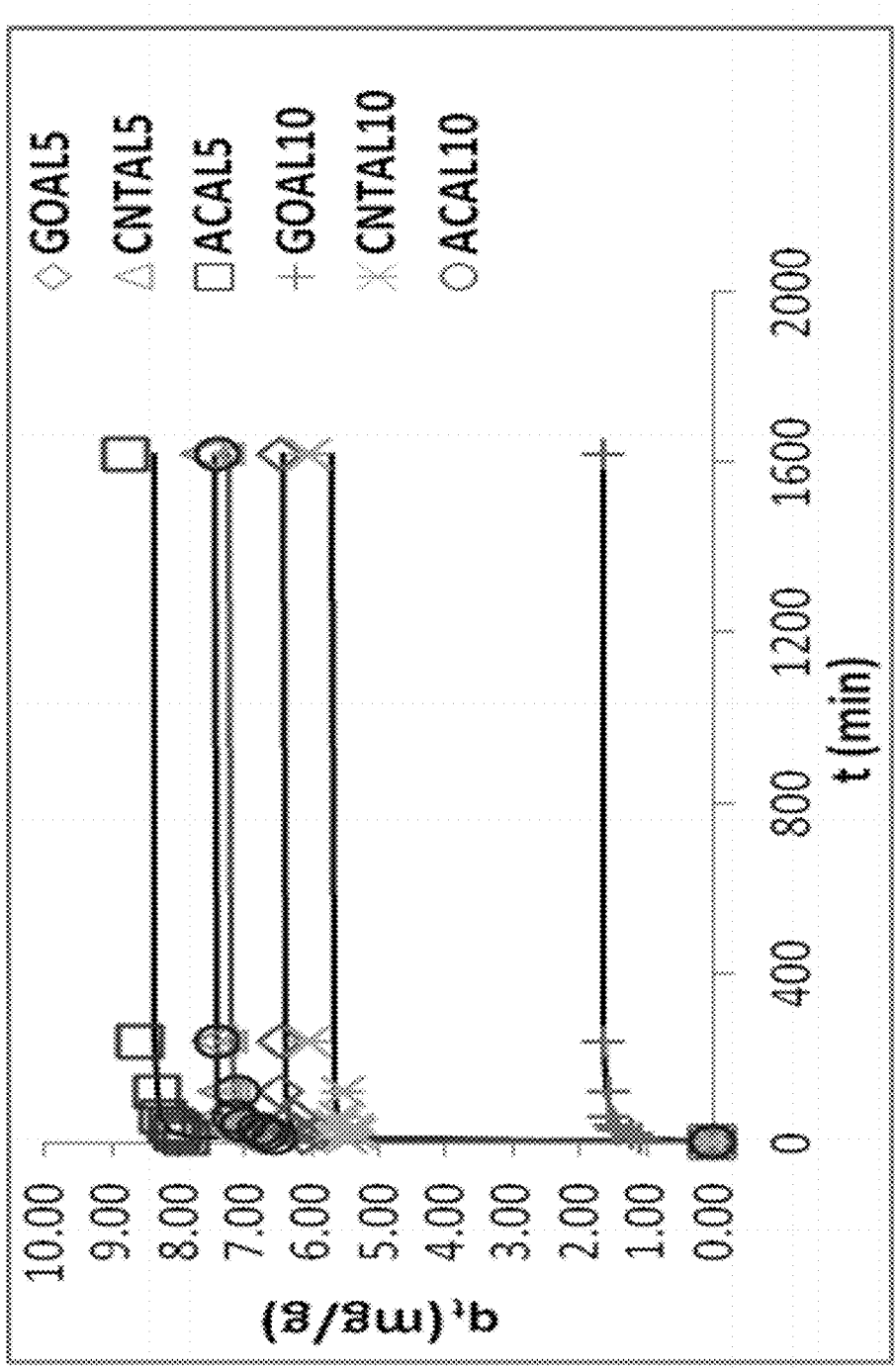
FIG. 34 is a graphical presentation of the adsorption capacity $q_t$ for thiophene with time using the $Al_2O_3$ impregnated carbonaceous materials as adsorbents as indicated. The temperature is 25° C., the shaking speed is 200 rpm, the adsorbent amount is 150 mg, and the initial concentration of thiophene is 250 ppm according to Example 4.
Figure 35:
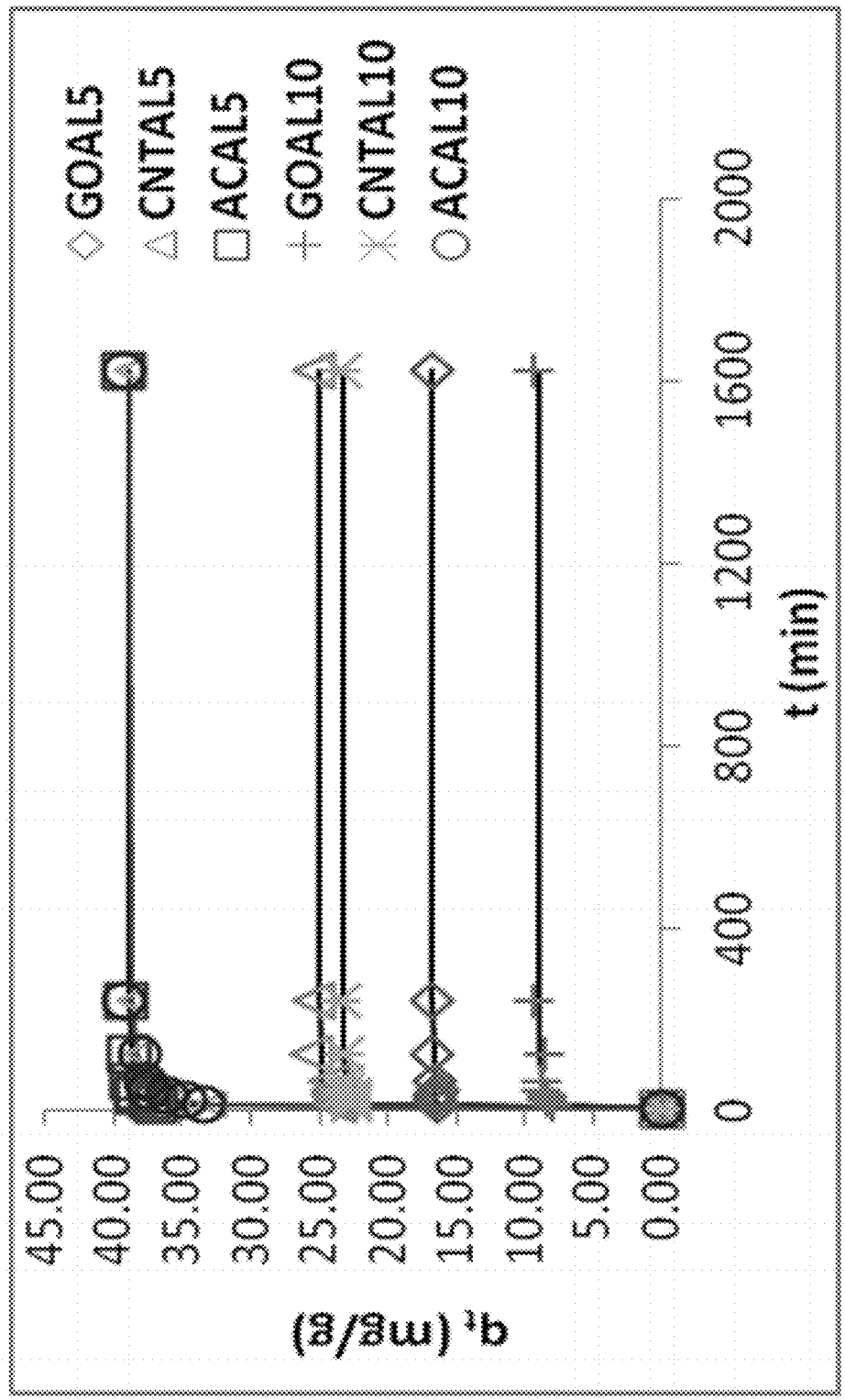
FIG. 35 is a graphical presentation of the adsorption capacity $q_t$ for DBT with time using the $Al_2O_3$ impregnated carbonaceous materials as adsorbents as indicated. The temperature is 25° C., the shaking speed is 200 rpm, the adsorbent amount is 150 mg, and the initial concentration of thiophene is 250 ppm according to Example 4.

Adsorption Kinetics of the $Al_2O_3$ Impregnated Carbonaceous Materials for DBT and Thiophene Adsorption Studying the adsorption kinetics in the batch mode is essential to design the adsorbent columns for further study and for industrial applications. To study the DBT and thiophene adsorption kinetics of the $Al_2O_3$ impregnated carbonaceous adsorbents, an n-hexane solution with an initial concentration of 250 ppm of either DBT or thiophene was mixed with each $Al_2O_3$ impregnated carbonaceous adsorbent and kept under shaking for 28 hours. The remaining and removed sulfur compound concentrations were measured at different times. Referring to FIGS. 34 and 35, the thiophene and DBT adsorption by all the adsorbents reached an equilibrium after 1 hour of mixing.

The experimental thiophene adsorption capacities ($q_{e,exp}$) of ACAL10, CNTAL10, GOAL10, ACAL5, CNTAL5 and GOAL5 were 7.42, 6.06, 1.63, 8.80, 7.63 and 6.49 mg/g, respectively. The experimental DBT adsorption capacities of ACAL10, CNTAL10, GOAL10, ACAL5, CNTAL5 and GOAL5 were 39.25, 23.36, 9.46, 39.21, 25.38 and 16.77 mg/g, respectively. Fast adsorption of thiophene and DBT was observed (as early as 30 min following the contact between the adsorbents and the model diesel containing the sulfur compounds), due to the maximum availability of the active sites on the adsorbents. The maximum adsorption of thiophene and DBT was achieved by 1 hour following the contact, accompanying the saturation of the active sites on the surfaces of adsorbents, with the remaining unoccupied active sites difficult to be accessed due to the repulsion force between the sulfur compound molecules adsorbed on the adsorbents and the free sulfur compound molecules remaining in the model diesel. The adsorption kinetics of the prepared adsorbents for DBT and thiophene was studied and fitted with the most frequently used kinetic models reported by Lagergren, i.e. the pseudo-first order kinetic model [Equation 6] and the pseudo-second order kinetic model [Equation 7]).

$$\ln(q_e - q_t) = \ln(q_e) - k_1 t \quad (6)$$

$$\frac{t}{q_t} = \frac{1}{q_e^2 k_2} + \frac{t}{q_e} \quad (7)$$

Where qe (mg/g) is the adsorption capacity at equilibrium, qt (mg/g) is the adsorption capacity at time t (min), $k_1$ (g $mg^{-1}$ $min^{-1}$) is the pseudo-first order rate constant, and $k_2$ (g $mg^{-1}$ $min^{-1}$) is the pseudo-second order rate constant. The DBT and thiophene adsorption data did not fit the pseudo-first order kinetic model, since the squared correlation coefficients ($R^2$) were very low, and the difference between the experimental adsorption capacity ($q_{e,exp}$) and the calculated adsorption capacity ($q_{e,pred}$) was very high (data not shown). By contrast, the $R^2$ values were unity by fitting with the pseudo-second order model at room temperature and at the initial concentration of 250 ppm for both DBT and thiophene. In addition, the experimental adsorption capacity values ($q_{e,exp}$) were very close to the calculated adsorption capacity values ($q_{e,pred}$) as shown in FIG. 36.

The effect of mass transfer resistance on the binding of DBT or thiophene to the adsorbents was verified using the intra-particle diffusion model. The intra-particle diffusion resistance affecting adsorption was examined using Equation 8:

$$q_e = k_{id} t^{0.5} + C \quad (8)$$

Where $k_{id}$ is the intra-particle diffusion rate constant (mg/g $min^{0.5}$), and C is a constant related to the thickness of the boundary layer (mg/g). Thus, the diffusion constant, $k_{id}$, can be obtained from the slope of a linear graph of qt versus the square root of time. If the linear graph goes through the origin, then intra-particle diffusion is the sole rate controlling step.

Figure 37:
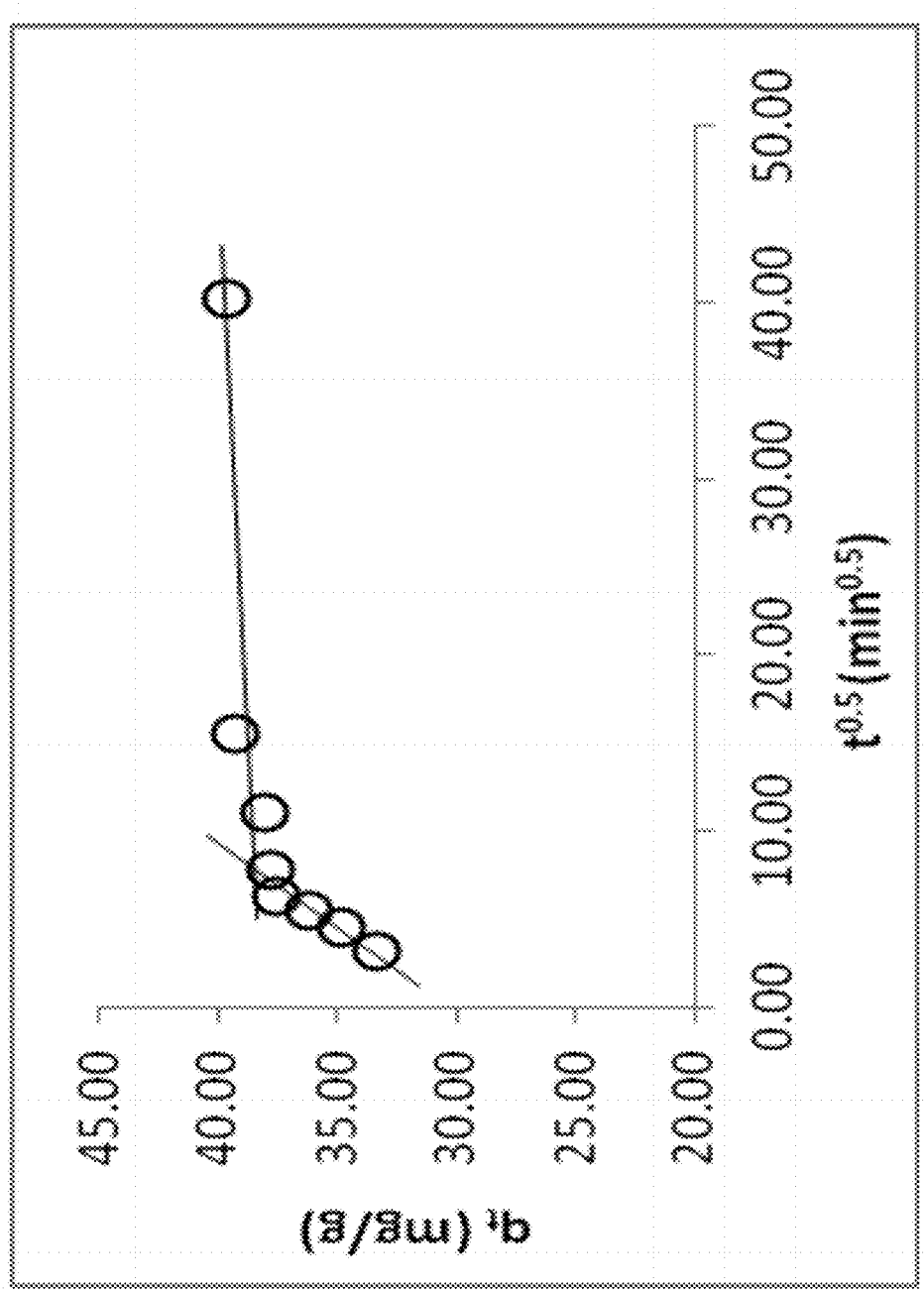
FIG. 37 is a graphical presentation of the adsorption capacity $q_t$ with the square root of time $t^{0.5}$ fitted by the intra-particle diffusion model for DBT adsorption using ACAL10 as the adsorbent according to Example 4.
Figure 38:
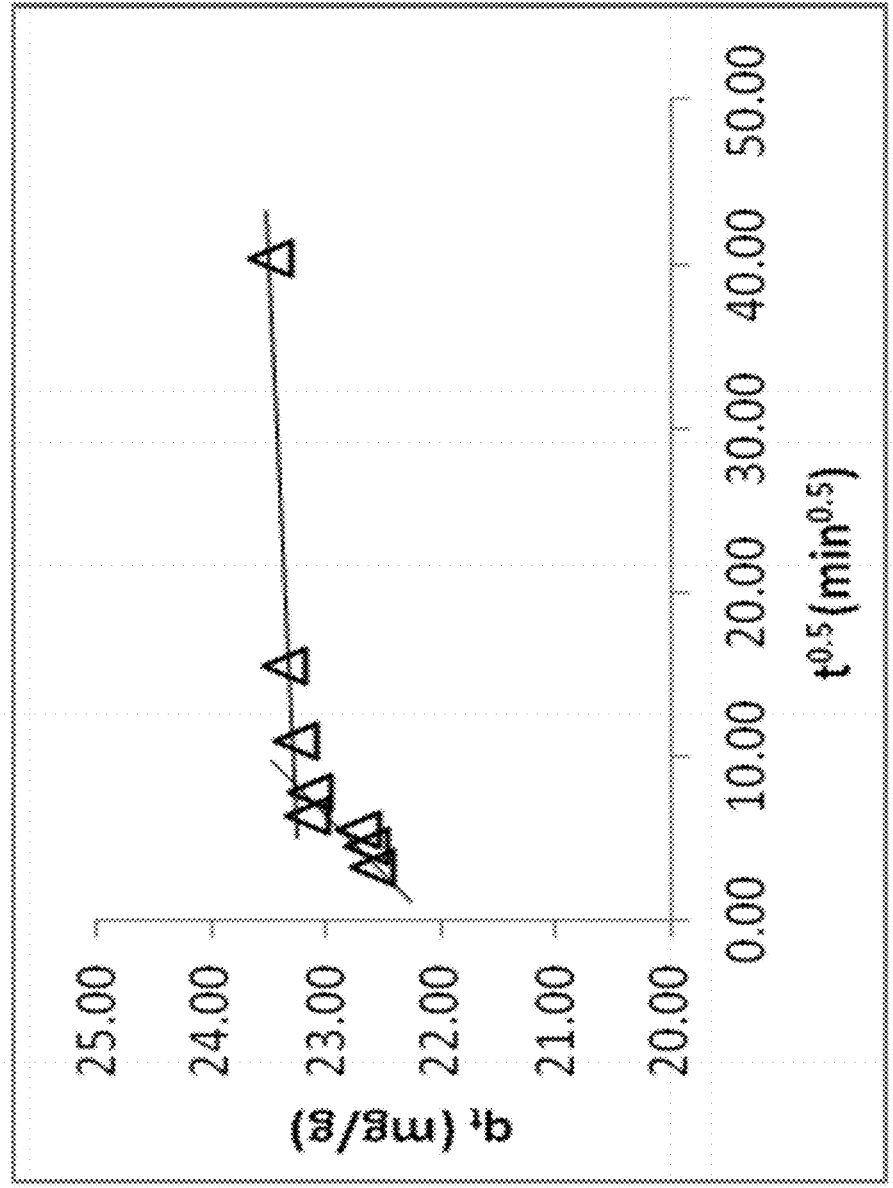
FIG. 38 is a graphical presentation of the adsorption capacity $q_t$ with the square root of time $t^{0.5}$ fitted by the intra-particle diffusion model for DBT adsorption using CNTAL10 as the adsorbent according to Example 4.
Figure 39:
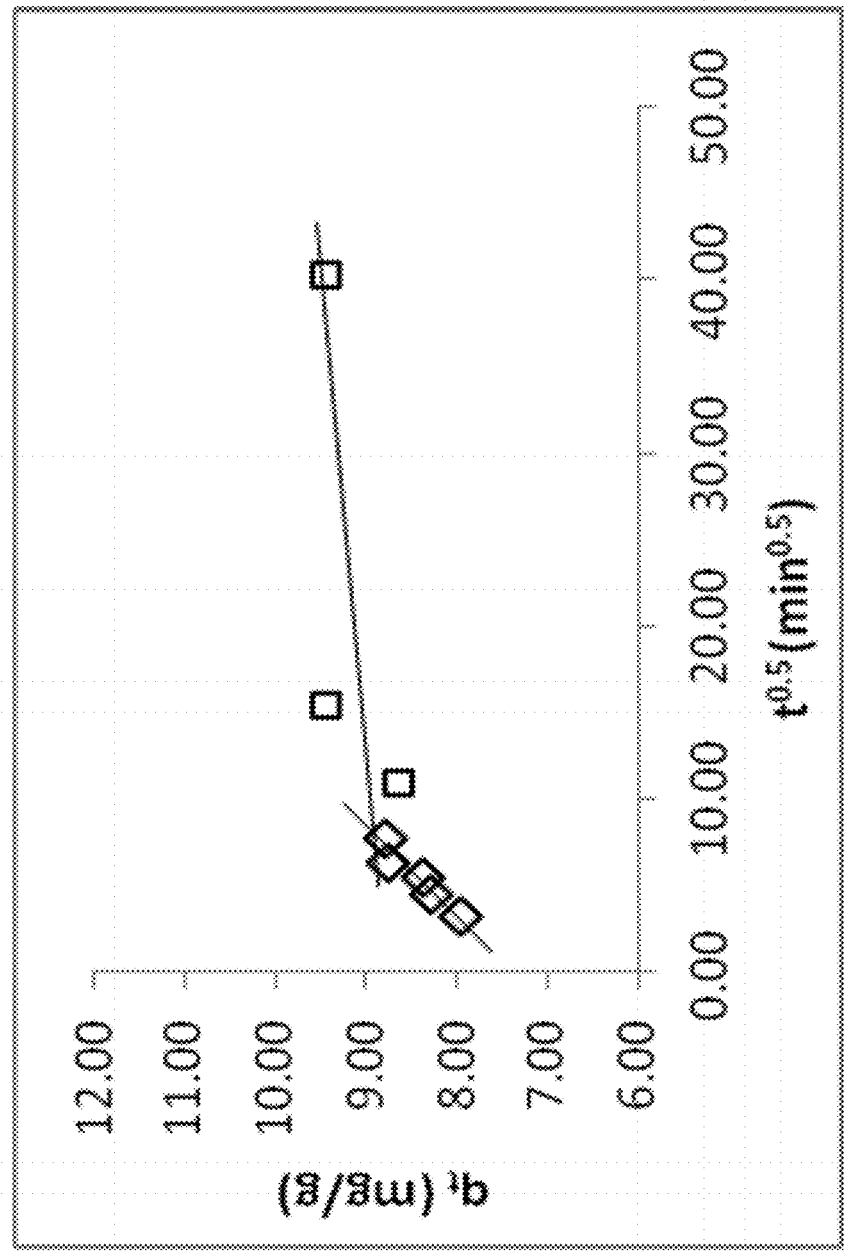
FIG. 39 is a graphical presentation of the adsorption capacity $q_t$ with the square root of time $t^{0.5}$ fitted by the intra-particle diffusion model for DBT adsorption using GOAL10 as the adsorbent according to Example 4.

FIGS. 37-39 show the graphs of qt versus $t^{0.5}$ for DBT with ACAL10, CNTAL10 and GOAL10 as the adsorbents. These results suggest that the adsorption processes involve more than a single kinetic stage or sorption rate. All the adsorbents exhibited two stages, which can be attributed to two linear parts of each graph. The first linear part can be attributed to intra-particle diffusion, which led to a delay in the adsorption process. The second stage may be regarded as diffusion through smaller pores, which is followed by the establishment of equilibrium. The presence of micropores on the adsorbents validates this second stage of the intra-particle diffusion process. FIG. 40 shows the calculated values of the diffusion constants. A higher value of $k_{id}$ represents a better rate of adsorption, which is related to stronger bonding between DBT and the adsorbent.

Example 5

Figure 41:
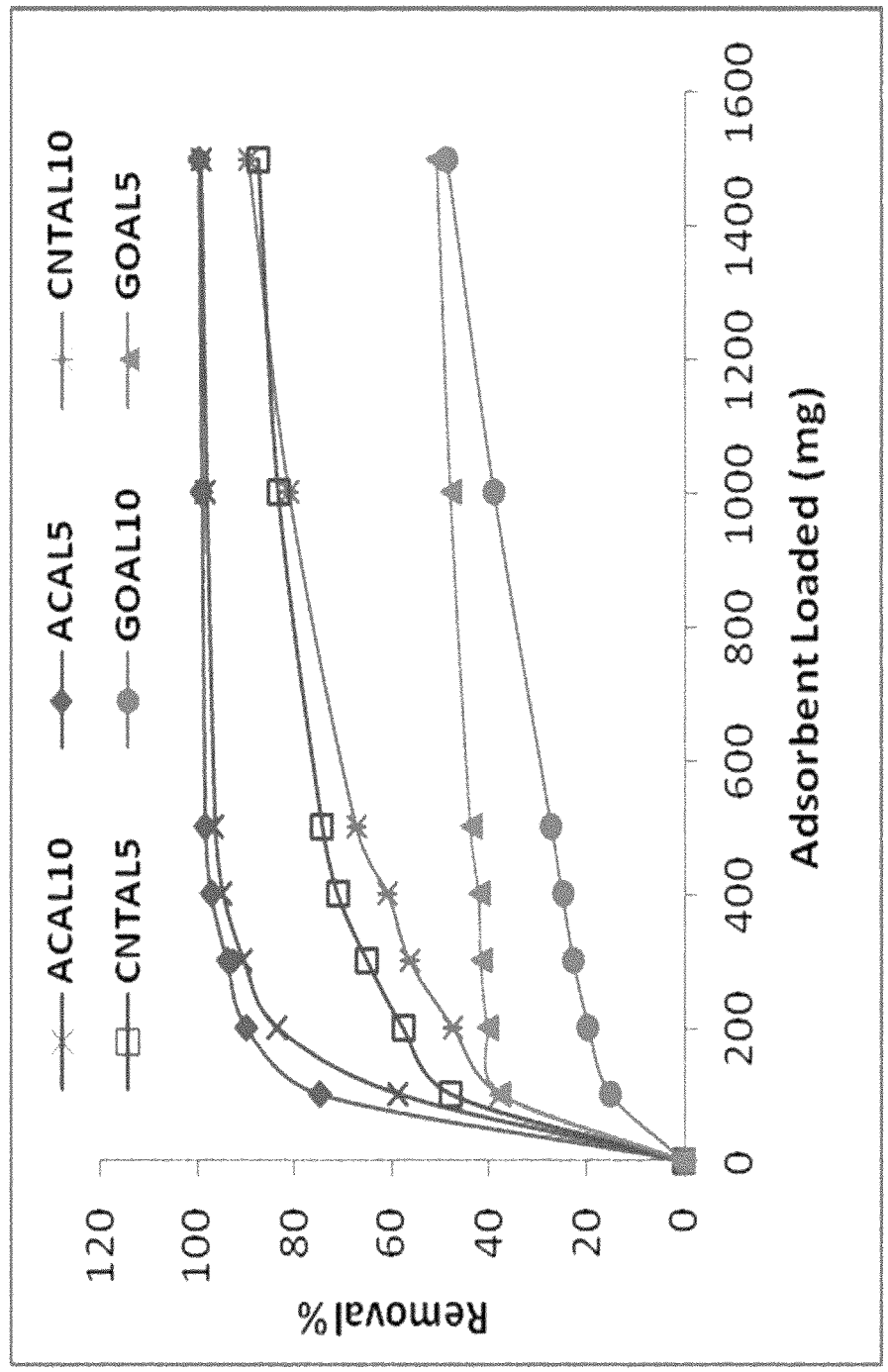
FIG. 41 is a graphical presentation of the relationship between the dose of the $Al_2O_3$ impregnated AC, CNT, or GO and the DBT removal efficiency. The DBT adsorption was performed at room temperature with the shaking speed of 200 rpm and the initial DBT concentration of 250 mg/L according to Example 5.
Figure 42:
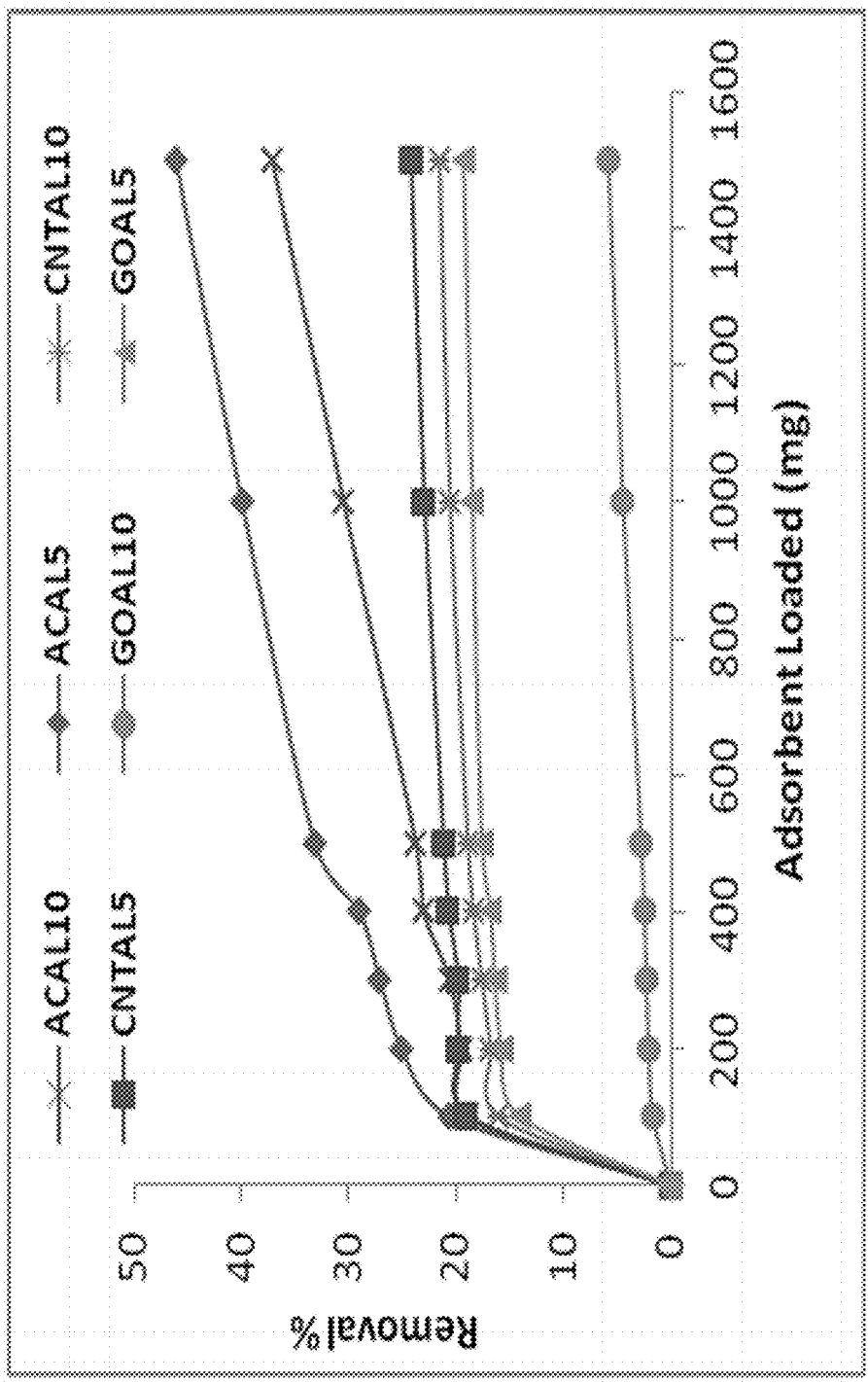
FIG. 42 is a graphical presentation of the relationship between the dose of the $Al_2O_3$ impregnated AC, CNT, or GO and the thiophene removal efficiency. The thiophene adsorption was performed at room temperature with the shaking speed of 200 rpm and the initial DBT concentration of 250 mg/L according to Example 5.

Effect of the Dosages of the $Al_2O_3$ Impregnated Carbonaceous Materials on the DBT and Thiophene Adsorption Efficiencies The effect of the adsorbent dosage on removal of DBT and thiophene was studied by varying the doses of the adsorbents from 100 to 1500 mg at fixed room temperature (25° C.), shaking speed (200 rpm) and initial concentration ($C_o$) of the sulfur compounds (250 mg/g) as shown in FIGS. 41-42. Increasing percentages of the DBT and thiophene were removed by the increasing doses of the $Al_2O_3$ impregnated AC. A high removal percentage of DBT (around 98.3%) was achieved at an adsorbent dosage of 500 mg for ACAL5 and ACAL10. The maximum adsorption of DBT (100% removal) was achieved with 1500 mg of the $Al_2O_3$ impregnated AC. The same trend of adsorption was observed when the $Al_2O_3$ impregnated AC was used to remove thiophene from the model diesel. Only a 30% removal efficiency for thiophene was achieved when 1500 mg of ACAL10 were used, and a 40% removal efficiency was achieved with 1500 mg of ACAL5. An 80% removal efficiency for DBT and a 20% removal efficiency for thiophene were obtained when CNTAL5 and CNTAL10 were used. Lower removal efficiencies for DBT and thiophene were obtained when the $Al_2O_3$ impregnated GO were used, due to the lower surface areas available compared to the $Al_2O_3$ impregnated AC and CNTs. Consequently, the adsorption sites on their surfaces are fewer than the available adsorption sites on the $Al_2O_3$ impregnated AC and CNTs, leading to the reduced adsorption capacity for the sulfur compounds in the model diesel.

Example 6

Adsorption Selectivity of ACAL5 and CNTAL5 for DBT Relative to Thiophene and Naph The selectivity of ACAL5 and CNTAL5 for removal of DBT relative to thiophene and Naph from n-hexane was studied. Thiophene was selected as a model molecule to represent small aromatic sulfur-containing compounds found in diesel fuel, and Naph was selected to represent poly aromatic hydrocarbon (PAH) compounds in diesel with a molecular structure close to that of DBT. The stock solution of the ternary mixture containing these three compounds (thiophene/DBT/Naph) in n-hexane was prepared with a concentration of 250 mg/L for both thiophene and DBT, and a concentration of 1000 mg/g for Naph to simulate the actual availability of the PAHs in actual diesel. 150 mg of each adsorbent were added to 25 mL of the n-hexane model diesel solution, and the batch adsorption experiments were performed at a shaking speed of 200 rpm for an adsorption time of 120 min and at room temperature. The concentrations of these three compounds were measured simultaneously before and after the adsorption equilibrium was achieved. The distribution coefficient was calculated for each compound based on the following Equation (9).

$$K_d = Q_e/C_e \quad (9)$$

Where $K_d$ is the distribution coefficient (L/g), $Q_e$ is the adsorption capacity (mg/g) and $C_e$ is the sulfur compound and Naph equilibrium concentration (mg/L). The distribution coefficient was used later to calculate the selectivity factor for DBT relative to thiophene and Naph according to the following Equation (10).

$$k = K_{d(DBT)}/K_{d(c)} \quad (10)$$

Where k expresses the adsorption selectivity factor using ACAL5 and CNTAL5, $K_d$ is the distribution coefficient and the subscript (c) is the competitor molecule (i.e. thiophene or Naph).

As shown in FIG. 43, ACAL5 and CNTAL5 exhibited high adsorption capacities of 54.348 and 34.014 mg/g for DBT, respectively. The removal efficiencies for DBT using these adsorbents were higher than the removal efficiency for Naph by about 4-fold. The selectivity factors of DBT relative to Naph were 25.03 and 6.536 for ACAL5 and CNTAL5, respectively. By contrast, the selectivity factors of DBT relative to thiophene were much higher, being 250.64 for ACAL5 and 143.782 for CNTAL5. The preferential adsorption for DBT relative to thiophene and Naph can be explained by three main factors. First, the size of DBT is closer to the size of the adsorbent pores, resulting in DBT being trapped into the adsorbents better than thiophene and Naph. Second, the dipole moment of DBT is higher than those of thiophene and Naph, leading to stronger van der waals and π-π interactions between DBT and the adsorbents surface. Third, thiophene has lower basicity compared to DBT which is a Lewis base. Thus, there is a stronger acid-base interaction between DBT and $Al_2O_3$ impregnated on the adsorbents surface, resulting in the higher adsorption capacity.

Example 7

Regeneration of the Adsorption Ability of the $Al_2O_3$ Impregnated AC and CNTs

Figure 44:
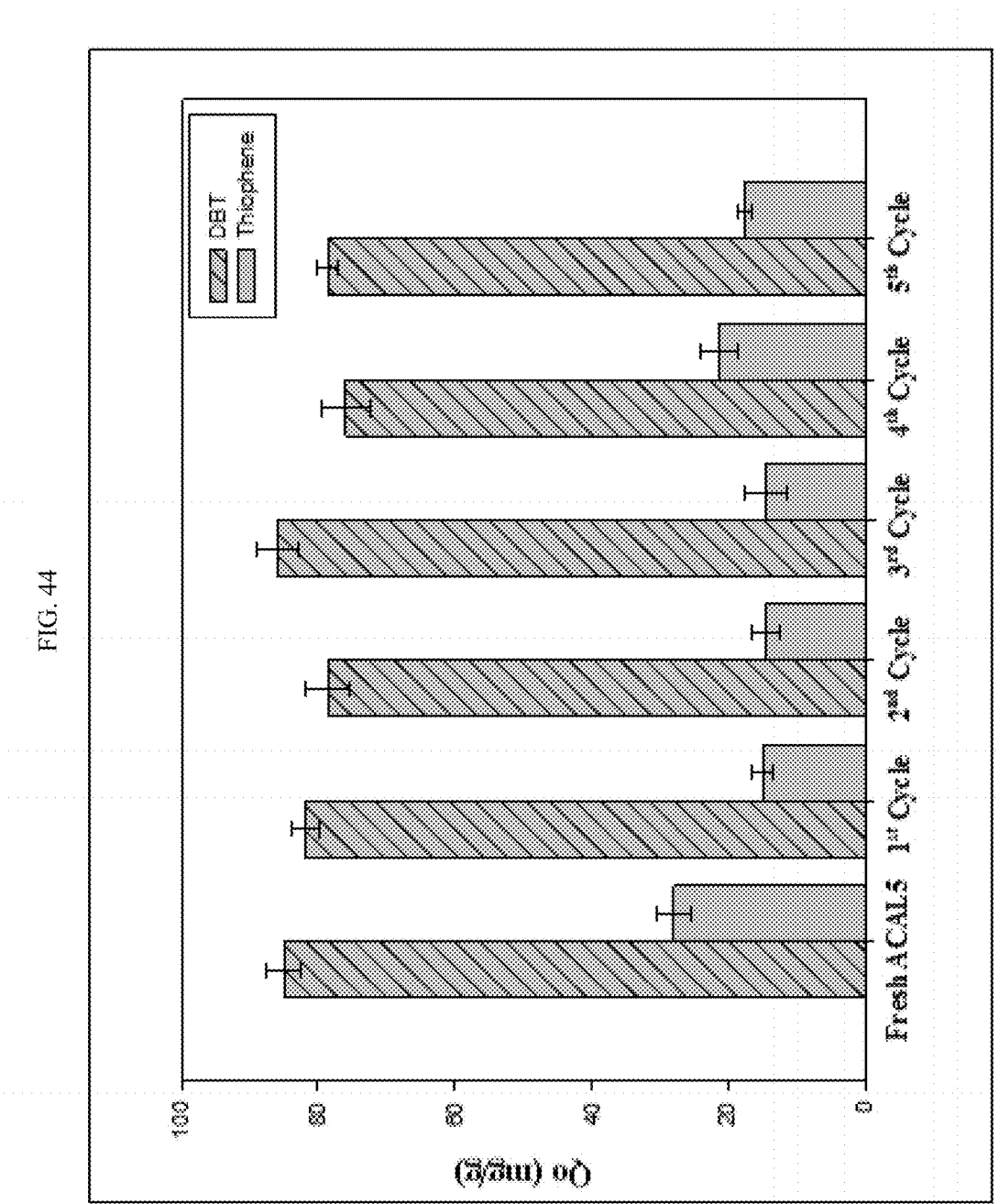
FIG. 44 is a graphical presentation of the adsorption capacity $Q_0$ for DBT and thiophene of the fresh ACAL5 and the ACAL5 after 1, 2, 3, 4, and 5 cycles of adsorption-desorption according to Example 7.
Figure 45:
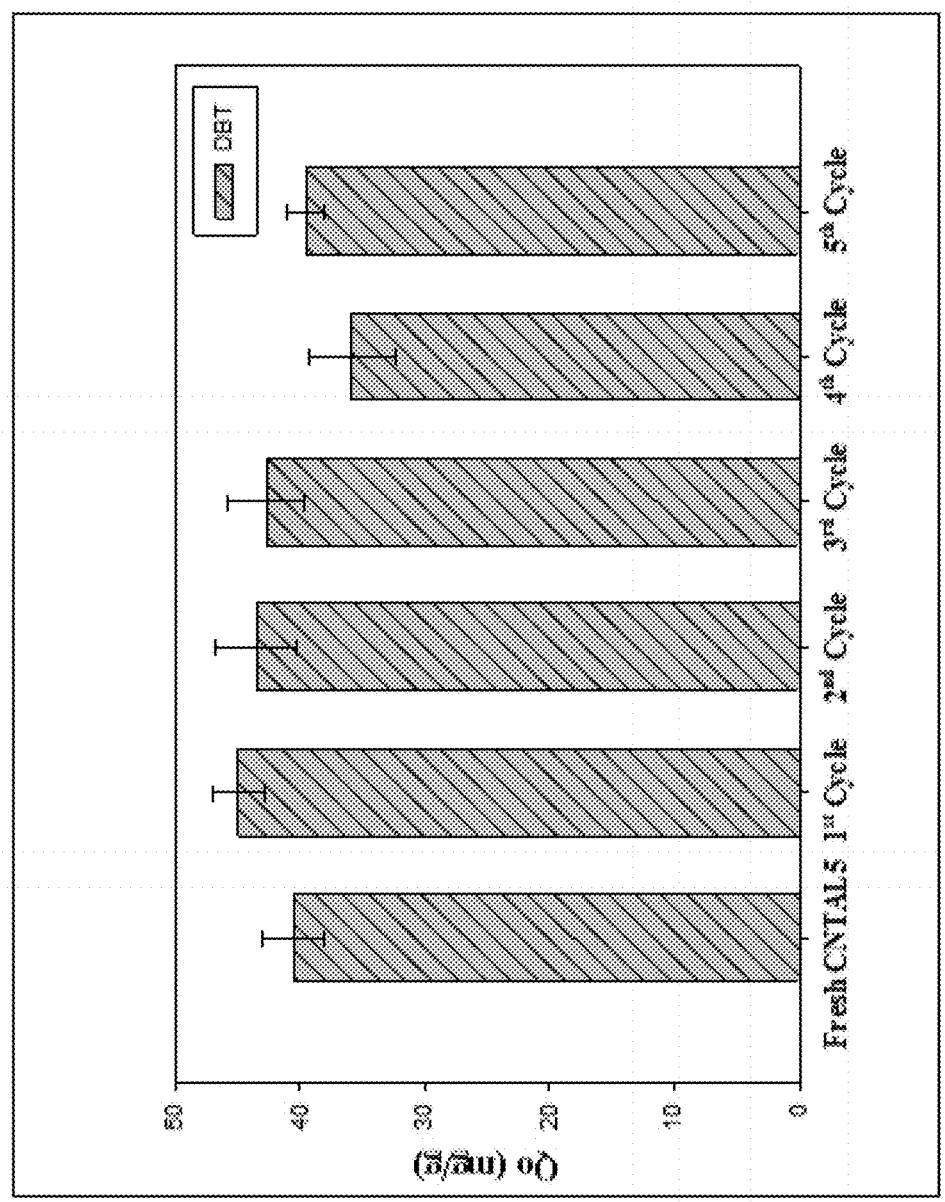
FIG. 45 is a graphical presentation of the adsorption capacity $Q_0$ for DBT of the fresh CNTAL5 and the CNTAL5 after 1, 2, 3, 4, and 5 cycles of adsorption-desorption according to Example 7.

Regeneration of ACAL5 and CNTAL5 was studied. Upon the completion of the adsorption experiments, ACAL5 and CNTAL5 loaded with DBT were filtrated, collected in crucibles, and then heated at 350° C. for 2 hours to remove the adsorbed DBT. The regenerated ACAL5 and CNTAL5 were reused for the next adsorption followed again by DBT desorption. Such an adsorption-desorption cycle was successively repeated five times. As shown in FIGS. 44 and 45, following 5 repeated adsorption-regeneration cycles, the stability of ACAL5 and CNTAL5 remained nearly unchanged, since their adsorption capacities for DBT lost no greater than about 10%. However, the adsorption capacity of ACAL5 for thiophene decreased by about 50% after the fifth cycle compared to the fresh ACAL5 adsorbent.

Example 8

Adsorption of DBT from a Real Diesel Sample

Since ACAL5 displayed the best adsorption capacity and selectivity for DBT among the prepared adsorbents, its potential application in removing DBT from real diesel was studied by mixing ACAL5 with a real diesel sample (purchased from a local gas station, Sahel gas station, in Dhahran city, Saudi Arabia), using the batch adsorption method similar to that with the model diesel. The DBT concentration in real sample was determined using gas chromatography (Agilent 7890 A) coupled with sulfur chemiluminescence detector (GC-SCD) (Dual Plasma Technology 355) using hydrophobic Agilent DB-1 GC capillary column (30 m×0.32 mm×1 m). Before the adsorption, the DBT concentration in the real diesel sample was 43.05 mg/L. After the adsorption, the DBT concentration in the real diesel sample was decreased 29.63% to 30.28 mg/L. To test the effectiveness of this adsorbent for DBT removal in real diesel at a higher concentration, the real diesel sample was spiked with DBT to increase its concentration to 152.82 mg/L. After the adsorption with ACAL5, the DBT concentration was reduced 33.12% to 102.23 mg/L. This relatively low DBT removal efficiency was probably due to the fact that real diesel contains a lot of other sulfur compounds and more aromatic and hydrocarbon molecules that may compete with DBT for adsorption. In addition, the solubility of DBT in real diesel is much higher, making its diffusion to the adsorbent surface lower compared with its diffusion in the model diesel.

The invention claimed is:

1. A method of removing sulfur compounds from a fuel, comprising:
   contacting the fuel with an adsorbent, wherein the adsorbent comprises a carbonaceous material doped with nanoparticles of aluminum oxide,
   wherein the contacting forms a treated fuel having a reduced concentration of the sulfur compounds,
   wherein the carbonaceous material is at least one selected from the group consisting of activated carbon, carbon nanotubes, and graphene oxide, and
   wherein the adsorbent has a weight ratio of C to Al in the range from 3:1 to 30:1, and a weight ratio of C to O in the range from 3:1 to 9:1.

2. The method of claim 1, wherein the carbon nanotubes are multi-walled carbon nanotubes.

3. The method of claim 1, wherein the carbonaceous material is doped with the nanoparticles of aluminum oxide by incipient wetness impregnation.

4. The method of claim 1, wherein the fuel is at least one selected from the group consisting of diesel, jet fuel, marine gas oil, and used motor oil, and wherein the sulfur compounds are at least one selected from the group consisting of benzothiophene (BT), alkyl-benzothiophene (alkyl-BT), dibenzothiophene (DBT), alkyl-dibenzothiophene (alkyl-DBT), and thiophene and derivatives thereof.

5. The method of claim 4, wherein the adsorbent comprises activated carbon doped with nanoparticles of aluminum oxide, and wherein the adsorbent removes at least about 30% of the DBT from the diesel fuel.

6. The method of claim 1, further comprising regenerating the adsorption ability of the adsorbent.

7. The method of claim 6, wherein the regenerating comprises heating the adsorbent at about 300-550° C. to remove the adsorbed sulfur compounds.

8. The method of claim 1, wherein the adsorbent is disposed in a fixed bed or fluidized bed and the contacting involves passing the fuel through the fixed bed or fluidized bed.

9. The method of claim 8, wherein the fixed bed comprises a cartridge.

10. The method of claim 9, wherein the cartridge further comprises at least one adsorbent selected from the group consisting of a zeolite, activated alumina, and activated carbon.

11. The method of claim 1, wherein the carbon nanotubes have an outer diameter ranging from about 10 nm to 30 nm.

12. The method of claim 1, wherein the nanoparticles of aluminum oxide have a diameter ranging from about 30 nm to 80 nm.

13. The method of claim 1, wherein the adsorbent comprises activated carbon doped with nanoparticles of aluminum oxide, and wherein the activated carbon doped with the nanoparticles of aluminum oxide has a BET surface area of greater than about 790 $m^2/g$.

14. The method of claim 1, wherein the adsorbent comprises activated carbon doped with nanoparticles of aluminum oxide, and wherein the activated carbon doped with the nanoparticles of aluminum oxide has a total pore volume of greater than about 0.39 $cm^3/g$.

15. The method of claim 1, wherein the adsorbent comprises multi-walled carbon nanotubes doped with nanoparticles of aluminum oxide, and wherein the multi-walled carbon nanotubes doped with the nanoparticles of aluminum oxide have a BET surface area of greater than about 115 $m^2/g$.

16. The method of claim 1, wherein the adsorbent comprises multi-walled carbon nanotubes doped with nanoparticles of aluminum oxide, and wherein the multi-walled carbon nanotubes doped with the nanoparticles of aluminum oxide have a total pore volume of greater than about 0.55 $cm^3/g$.

17. The method of claim 1, wherein the nanoparticles of aluminum oxide have a diameter ranging from about 50 nm to 60 nm.

18. The method of claim 1, wherein the adsorbent comprises activated carbon doped with nanoparticles of aluminum oxide, and wherein the activated carbon doped with the nanoparticles of aluminum oxide has a BET surface area of greater than about 900 $m^2/g$.

19. The method of claim 1, wherein the nanoparticles of aluminum oxide form a layer covering a surface of an activated carbon sheet of the doped activated carbon and/or a graphene oxide sheet of the doped graphene oxide, and/or covering an exterior surface and/or an interior surface of the doped carbon nanotube.

20. A method of removing sulfur compounds from a fuel, comprising:
    contacting the fuel with an adsorbent, wherein the adsorbent comprises a carbonaceous material doped with nanoparticles of aluminum oxide,
    wherein the contacting forms a treated fuel having a reduced concentration of the sulfur compounds,
    wherein the carbonaceous material is at least one selected from the group consisting of activated carbon, carbon nanotubes, and graphene oxide, and
    wherein the adsorbent comprises 13-38% nanoparticles of aluminum oxide and 62-87% carbonaceous material by weight based on the total weight of the adsorbent.

* * * * *